(12) United States Patent
Kubozuka

(10) Patent No.: US 7,295,403 B2
(45) Date of Patent: Nov. 13, 2007

(54) CARTRIDGE FOR RECORDING MEDIUM

(75) Inventor: Masaaki Kubozuka, Tochigi (JP)

(73) Assignee: Sony Corporation, Tokyo (JP)

( * ) Notice: Subject to any disclaimer, the term of this patent is extended or adjusted under 35 U.S.C. 154(b) by 387 days.

(21) Appl. No.: 11/011,080

(22) Filed: Dec. 15, 2004

(65) Prior Publication Data

US 2005/0168872 A1  Aug. 4, 2005

(30) Foreign Application Priority Data

Dec. 26, 2003  (JP) ............................. 2003-434864

(51) Int. Cl.
  *G11B 23/03*  (2006.01)
(52) U.S. Cl. ..................................... 360/133
(58) Field of Classification Search ................ 720/729; 360/133
See application file for complete search history.

(56) References Cited

FOREIGN PATENT DOCUMENTS

| JP | 3-183080 | 8/1991 |
|----|----------|--------|
| JP | 7-111061 | 4/1995 |
| JP | 8-124350 | 5/1996 |

*Primary Examiner*—A. J. Heinz
*Assistant Examiner*—Mark Blouin
(74) *Attorney, Agent, or Firm*—Oblon, Spivak, McClelland, Maier & Neustadt, P.C.

(57) ABSTRACT

It is an object of the invention to provide a disk cartridge having a substantially identical form to that of a disk cartridge that accommodates a disk-shaped recording medium having a first recording capacity and accommodating a disk-shaped recording medium having a second recording capacity, which is higher than the first recording capacity, wherein the disk cartridge includes a write protect mechanism, which is different from a write protect mechanism for the disk cartridge accommodating the disk-shaped recording medium having the first recording capacity.

5 Claims, 21 Drawing Sheets

CARTRIDGE FOR RECORDING MEDIUM

BACKGROUND OF THE INVENTION

1. Field of the Invention

The present invention relates to a disk cartridge including a write protect mechanism for one disk having a recording capacity that is different from a recording capacity of another disk but having an identical external form to that of the other disk, with a write protect mechanism for the other disk having the different recording capacity held at a write disable state.

2. Description of the Related Art

Hitherto, a disk cartridge includes a disk-shaped recording medium such as an optical disk and a magneto-optical disk rotatably accommodated within a cartridge body thereof and includes a write protect member provided on one side of the cartridge body for preventing improper writing and/or erasing of data to and/from the disk-shaped recording medium. FIGS. 21 to 23B show a write protect mechanism of a disk cartridge 10 called mini disk (MD) as that kind of disk cartridge. Here, FIG. 21 is an exploded perspective view of a part of the disk cartridge 10 where a write protect member 101 is attached. FIGS. 22A and 22B are internal plan views of a lower half 103 where the write protect member 101 is at a write enable position. FIGS. 23A and 23B are internal plan views of the lower half 103 where the write protect member 101 is at a write disable position.

The write protect member 101 is a molded product made of a synthetic resin material such as polypropylene and is assembled in a storage section 104 at one corner of the lower half 103. The storage section 104 includes a write enable/disable detecting hole 105 into which a write protect detecting plug of a writer/reader side enters for detecting whether writing to the disk-shaped recording medium is enabled or disabled. In the storage section 104, the write protect member 101 is operated to selectively move to a write enable position that closes the write enable/disable detecting hole 105 or a write disable position that opens the write enable/disable detecting hole 105 through an operation guiding hole 106 provided by butting an upper half 102 and the lower half 103 against each other.

A writer/reader determines that the recording medium is write-enabled if the write protect detecting plug of the writer/reader entered into the write enable/disable detecting hole 105 is restricted by the write protect member 101. On the other hand, the writer/reader determines that the recording medium is write-disabled when the write protect detecting plug can enter into the write enable/disable detecting hole 105 without restriction.

As shown in FIGS. 22B and 23B, the mini disk cartridge 10 has a spare hole 107 adjacent to the write enable/disable detecting hole 105. The spare hole 107 has a circular opening part of a substantially equal diameter to that of the write enable/disable detecting hole 105.

In recent years, increases in recording density and recording capacity of a disk-shaped recording medium have been demanded. For example, for the disk cartridge 10 mainly for music application, a disk cartridge having a disk-shaped recording medium with a recording capacity high enough for writing video data of moving images, for example, and writers/readers therefor have been developed. Like an existing disk cartridge having a low recording capacity, the disk cartridge having a high recording capacity includes a write protect member for protecting the disk-shaped recording medium from improper writing and/or erasing thereto and/or therefrom. Furthermore, for the convenience of use, a writer/reader compliant thereto has been also developed which has a function of reading from an existing disk cartridge having a low recording capacity.

Documents of related art of the invention are:
JP-A-63-184953 and
JP-A-9-245460

However, a disk cartridge having a high recording capacity and the disk cartridge 10 having a low recording capacity largely differ in track density and so on. Thus, even when a writer/reader compliant with a disk cartridge having a low recording capacity tries to write data to a disk cartridge having a high recording capacity, proper writing cannot be performed since the width of the magnetic head of the recorder/writer is wide across multiple tracks.

Especially, when a writing operation is improperly performed on a disk cartridge having a high recording capacity with the disk cartridge installed to a writer/reader compliant with a disk cartridge having a low recording capacity, an operation of a magnetic head and optical head may be come unstable, which may cause a failure in the recorder/writer, or the operation is stopped with the magnet head or optical head facing toward the disk surface, which may prevent the ejection of the cartridge, since the disk recording surfaces differ in specification and construction.

SUMMARY OF THE INVENTION

Accordingly, the invention was made in view of these problems, and it is an object of the invention to provide a disk cartridge, which is a second disk cartridge having a higher recording capacity than that of a first disk cartridge serving as a standard, the disk cartridge including a write protect mechanism that can inhibit operations of writing or erasing data to or from the second disk cartridge by a writer/reader compliant with the first disk cartridge.

According to the invention, there is provided a disk cartridge having a disk-shaped recording medium to and/or from which data can be recorded and/or erased, a cartridge body that accommodates the disk-shaped recording medium, write enable/disable detecting holes in the cartridge body for detecting whether data can be written to and/or erased from the disk-shaped recording medium, and a write protect preventing member slidably attached to the cartridge body for opening and closing the write enable/disable detecting holes and selectively being operated to move to a write enable position or an write disable position in accordance with the open and closed state thereof, in which the disk cartridge is a second disk cartridge having a substantially identical form to that of a first disk cartridge for accommodating a disk-shaped recording medium having a first recording capacity and accommodates a disk-shaped recording medium having a second recording capacity, which is a higher recording capacity than that of the disk-shaped recording medium having the first recording capacity, the disk cartridge including:

the write enable/disable detecting hole including the first write enable/disable detecting hole at a write enable/disable detecting position for the first disk cartridge and a second write enable/disable detecting hole at a write enable/disable detecting position for the second disk cartridge; and the write protect member being a single member assembled in the positions of the first write enable/disable detecting hole and second write enable/disable detecting hole and is moved to the write disable position or the write enable position of the second write enable/disable detecting hole but is always placed at the write disable position of the first write enable/disable detecting hole.

BRIEF DESCRIPTION OF THE DRAWINGS

FIG. 9A shows an inner side of the lower half 23, and FIG. 9B shows an outer side of the lower half 23;

FIG. 10A shows the inner side of the lower half 23 and FIG. 10B shows the outer side of the lower half 23;

FIG. 11A shows a write enable state, and FIG. 11B shows a write disable state;

FIG. 19A is a perspective view from the lower half 23 side, and FIG. 19B is a perspective view of a main part section;

FIG. 20A is a perspective view from the lower half 23 side, and FIG. 20B is a perspective view of a main part section;

FIG. 22A shows an inner side of the lower half 103, and FIG. 22B shows an outer side of the lower half 103; FIG. 23A shows the inner side of the lower half 103, and FIG. 23B shows the outer side of the lower half 103.

DESCRIPTION OF THE PREFERRED EMBODIMENTS

Embodiments of the invention will be described below with reference to drawings. In the embodiments, a disk cartridge 20 is a mini disk (MD) cartridge (second disk cartridge) having a higher recording capacity than that of a conventional disk cartridge (first disk cartridge), which was described with reference to FIGS. 21 to 23B.

Figure 1:
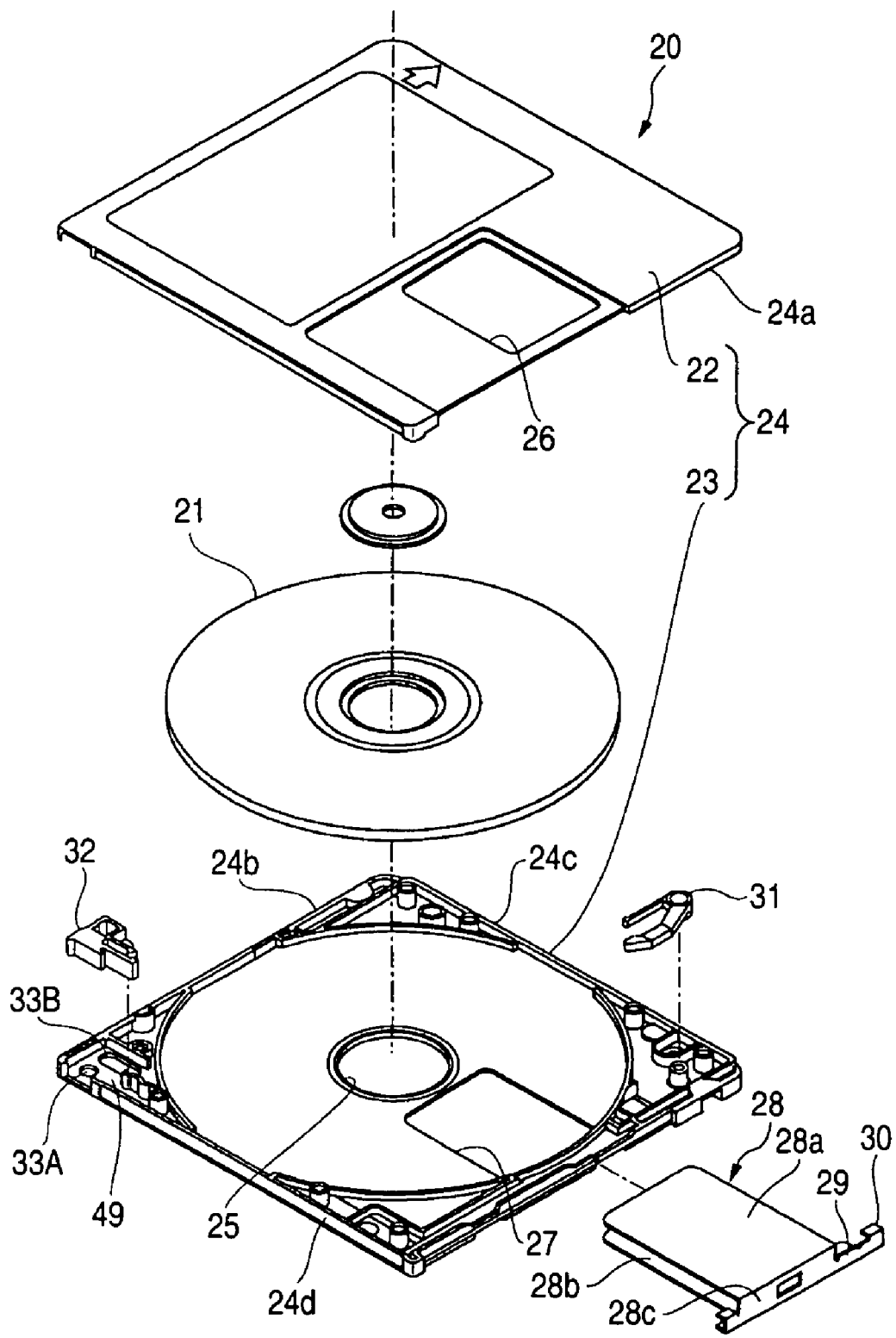
FIG. 1 is an exploded perspective view of a disk cartridge 20 according to an embodiment of the invention.
Figure 2:
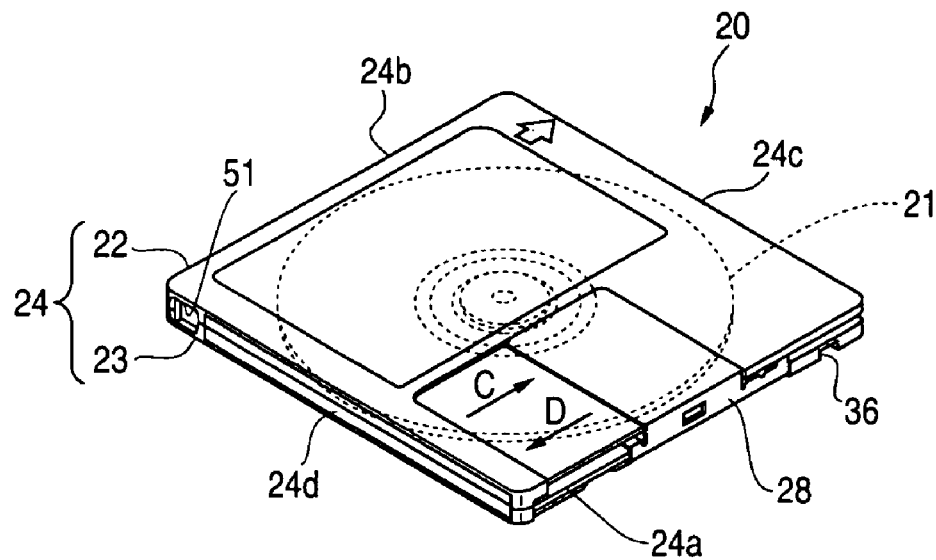
FIG. 2 is an entire perspective view of an upper half 22 side of the disk cartridge 20.
Figure 3:
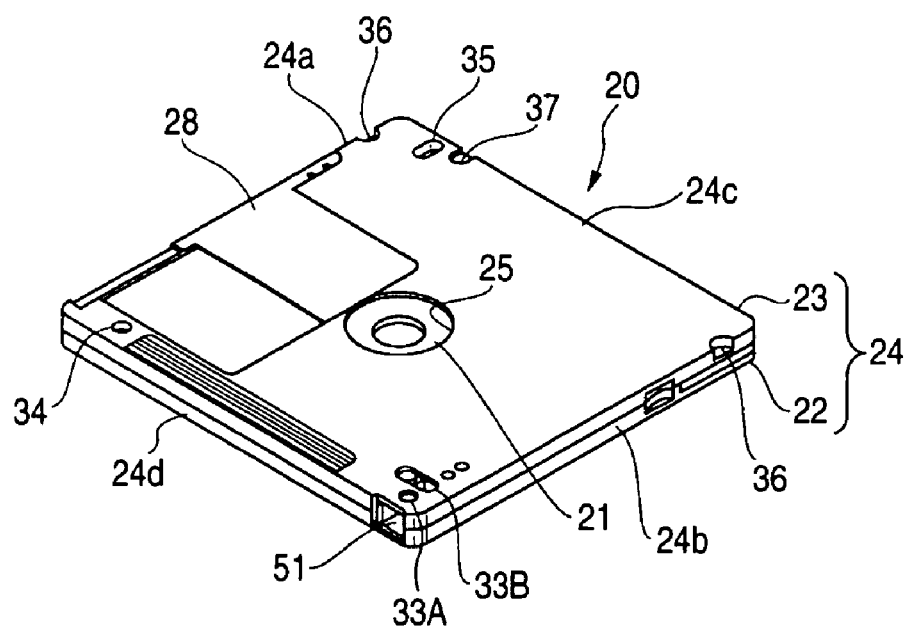
FIG. 3 is an entire perspective view of a lower half 23 side of the disk cartridge 20.

FIGS. 1 to 3 show the disk cartridge 20 according to this embodiment of the invention. FIG. 1 is an exploded perspective view of the disk cartridge 20. FIG. 2 is an entire perspective view of an upper half 22 side of the disk cartridge 20. FIG. 3 is an entire perspective view of a lower half 23 of the disk cartridge 20.

The disk cartridge 20 according to this embodiment includes a cartridge body 24 having the upper half 22 and lower half 23 butted against and bonded to each other. The upper half 22 and lower half 23 are made of a synthetic resin such as polycarbonate and has a square form. A disk-shaped recording medium 21 is rotatably accommodated within the cartridge body 24.

The disk-shaped recording medium 21 only needs to be one from which data recorded thereon once can be erased and to which new data signals can be overwritten and is not limited in particular. The disk-shaped recording medium 21 is a magneto-optical disk in this embodiment.

The cartridge body 24 has a disk-table enter opening part 25 through which a disk table of a disk rotor that operates to rotate the disk-shaped recording medium 21 accommodated in the cartridge body 24 enters when the disk-cartridge 20 is installed in a writer/reader.

The upper half 22 and lower half 23 of the cartridge body 24 have data write/read opening parts 26 and 27, respectively, that expose a signal writing area of the disk-shaped recording medium 21 to the outside at a circumferential part and from the inner circumference side to the outer circumference side thereof. These data write/read opening parts 26 and 27 extend from a position near the disk table enter opening part 25 to a position near a front face 24a of the cartridge body 24 and is positioned a substantially longitudinal center of the front face 24a, and the data write/read opening parts 26 and 27 have a substantially square form.

Furthermore, in order to prevent invasion of dust into the internal part of the cartridge body 24 through the data write/read opening parts 26 and 27 and adhesion of the dust to the disk recording medium 21 accommodated inside, the cartridge body 24 includes a shutter member 28 that closes the data write/read opening parts 26 and 27.

The shutter member 28 is formed by bending a thin metallic plate and punching it to a predetermined form and includes shutter sections 28a and 28b that close the data write/read opening parts 26 and 27, respectively, and a connecting piece 28c that connects sides of these shutter sections 28a and 28b. The shutter member 28 has a substantially inverted-C-shaped section as a whole. A shutter slide guiding section 29 extends on one end side of the connecting piece 28c. The shutter slide guiding section 29 guides the shutter member 28 such that the shutter member 28 can slide along and in parallel with the front face 24a of the cartridge body 24.

The shutter member 28 is attached to the cartridge body 24 such that the shutter sections 28a and 28b can slide in the directions indicated by the arrows C and D in FIG. 2 between an opening part closing position that closes the data write/read opening parts 26 and 27 and an opening part opening position that opens the data write/read opening parts 26 and 27.

On the other hand, as shown in FIG. 1, a shutter lock member 31 is provided at one corner part on the front face 24a side of the lower half 23 included in the cartridge body 24. The shutter lock member 31 is provided for preventing opening of the data write/read opening parts 26 and 27 upon unintentionally operated to move when the shutter member 28 is at the position that closes the data write/read opening parts 26 and 27 as shown in FIGS. 2 and 3. The shutter lock member 31 associates with an associated piece 30 which is formed by bending a part of the shutter slide guiding section 29 of the shutter member 28 shown in FIG. 1 so that the shutter member 28 can be held at the closing position.

Next, as shown in FIG. 3, the lower half 23 side of the cartridge body 24 has positioning pin associating holes 34 and 35 with which positioning pins associate. The positioning pins determine the position where the cartridge 20 is attached when the cartridge 20 is attached to a cartridge attachment portion within a writer/reader. These positioning pin associating holes 34 and 35 are positioned on the side face 24c side and side face 24d side of the cartridge body 24 and closely to the front face 24a of the cartridge body 24.

As shown in FIG. 3, the lower half 23 side of the cartridge body 24 has loading mechanism associating concaves 36 and 36 with which cartridge holding nails of an auto-loading mechanism associate. The auto-loading mechanism is used for automatically attaching the disk cartridge 20 to a cartridge attachment part within a writer/reader. The loading mechanism associating concaves 36 and 36 are positioned closely to the side face 24c of the cartridge body 24 and extend from the lower surface of the cartridge body 24 to the front face 24a side and from the lower surface of the cartridge body 24 to the back face 24b side.

As shown in FIG. 3, the lower half 23 side of the cartridge body 24 has a magneto-optical disk indicating concave 37 that indicates that the disk-shaped recording medium 21 accommodated in the cartridge body 24 is a magneto-optical disk. The magnet-optical disk indicating concave 37 is positioned closely to the front face 24a side of the cartridge body 24 and on the side 24c side of the cartridge body 24.

Figure 5:
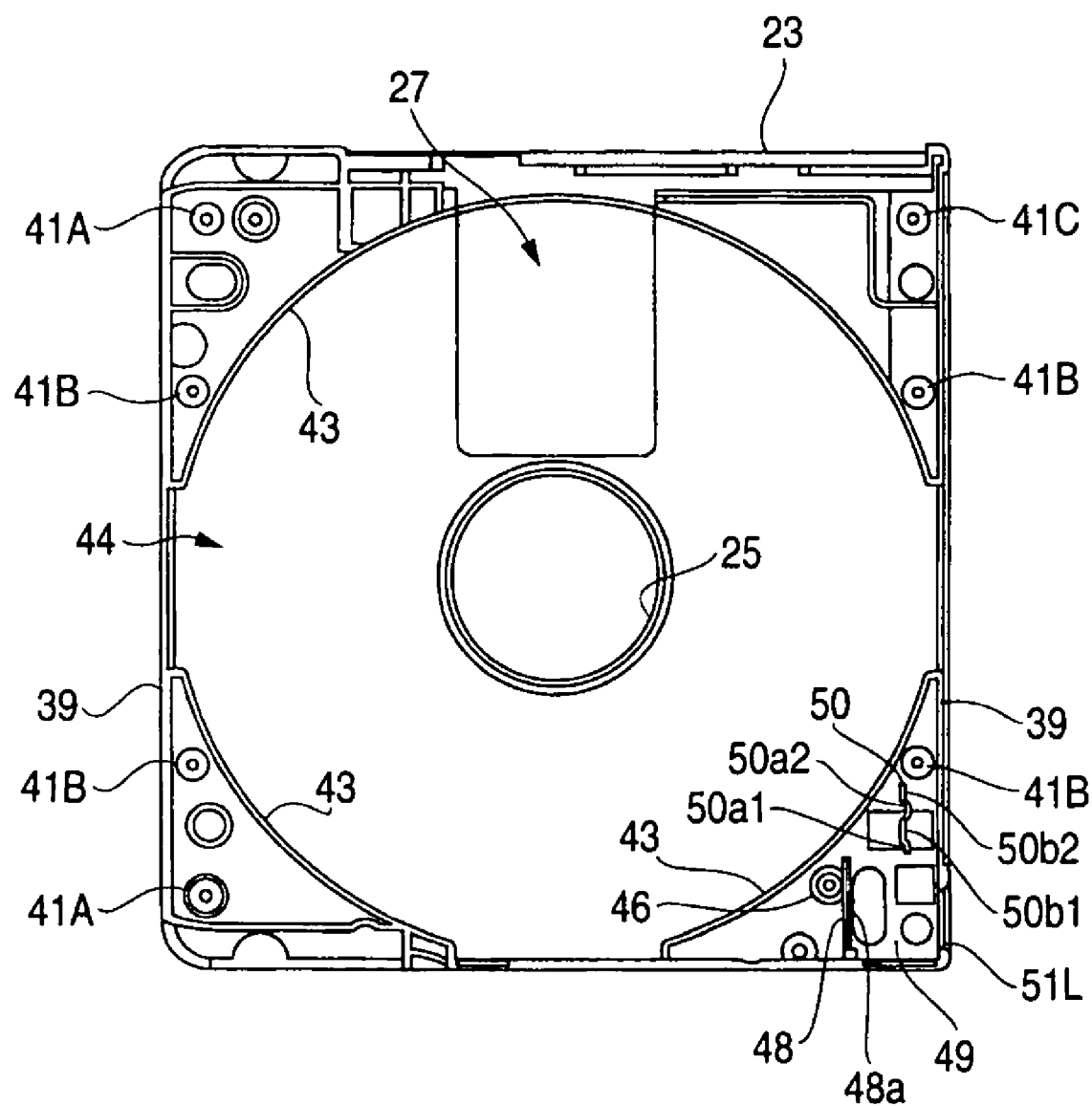
FIG. 5 is a plan view illustrating an internal structure of the lower half 23.

Furthermore, as shown in FIGS. 3 and 5, the corner part of the lower half 23 of the cartridge body 24 where the side face 24d and back face 24b of the cartridge body 24 cross has a storage section 49 for accommodating the write protect member 32. The storage section 49 has a first write enable/disable detecting hole 33A and a second write enable/disable detecting hole 33B therethrough. Details of the write protect member 32 and first and second write enable/disable detecting holes 33A and 33B will be described later.

Figure 4:
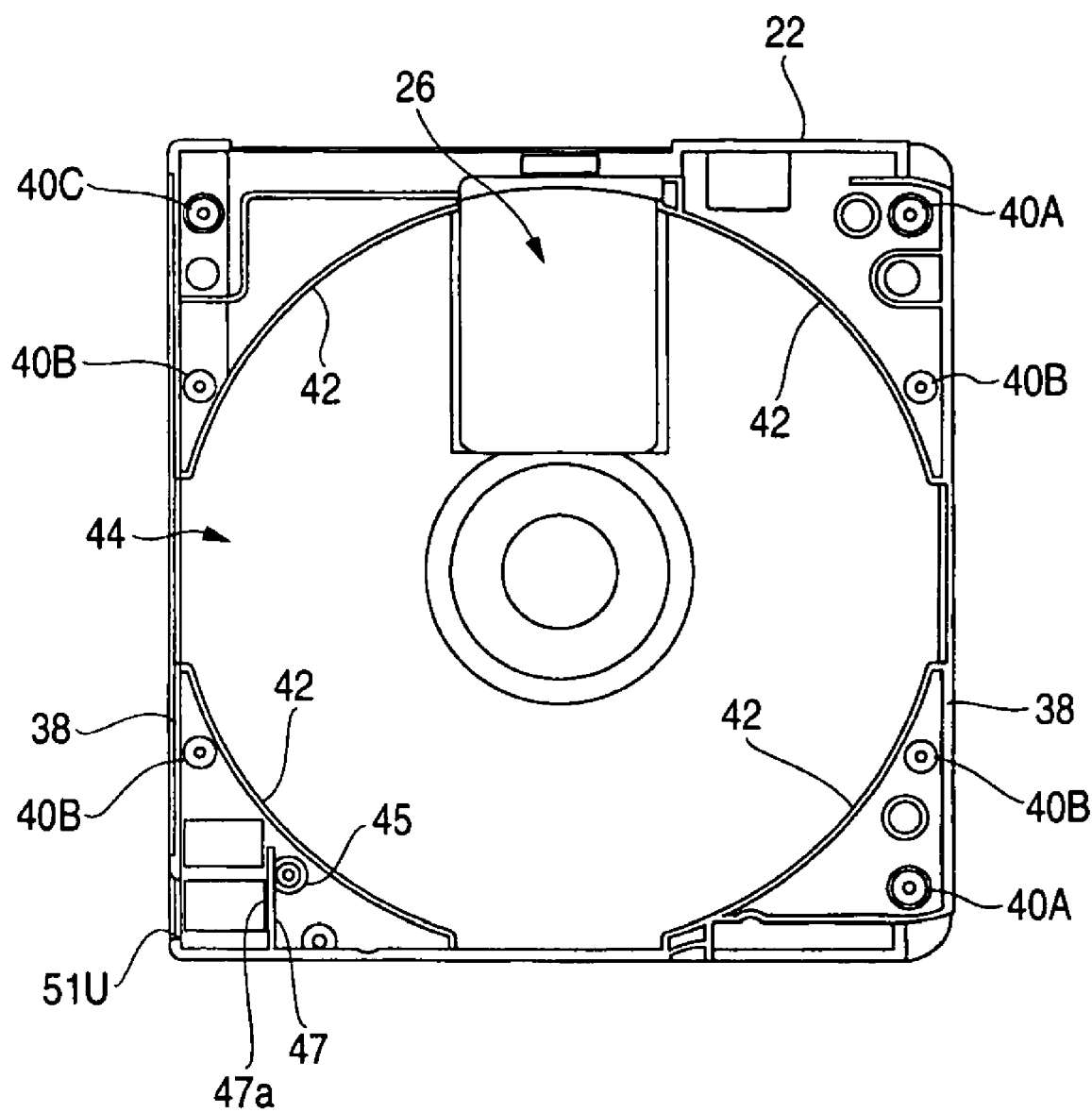
FIG. 4 is a plan view illustrating an internal structure of the upper half 22.

FIGS. 4 and 5 show inner structures of the upper half 22 and lower half 23, respectively.

As shown in FIGS. 4 and 5, the upper half 22 and lower half 23 of the cartridge body 24 integrally and circumferentially have a rising circumferential wall 38 and rising circumferential wall 39, respectively. The outer circumference wall of the cartridge body 24 includes the rising circumferential walls 38 and 39 butted against each other with the upper half 22 and the lower half 23 integrally bonded through butt-fitting convexes 40A to 40C and butt-fitting convexes 41A to 41C.

As shown in FIGS. 4 and 5, the upper half 22 and the lower half 23 integrally have a wall 42 and a wall 43, respectively, standing on facing internal walls thereof. These walls 42 and 43 partition and provide a disk accommodating section 44 that rotatably accommodates the disk-shaped recording medium 21 with the upper half 22 and lower half 23 bonded to each other. These wall 42 and wall 43 extend along multiple arcs positioned on the same circumference internally in contact with the rising circumferential wall 38 and rising circumferential wall 39, respectively.

As shown in FIGS. 4 and 5, the upper half 22 and lower half 23 have the butt-fitting convexes 40A to 40C and the butt-fitting convexes 41A to 41C, which exhibit cylindrical forms having substantially equal diameters and are paired, standing at multiple positions on the internal surfaces facing toward each other. The butt-fitting convexes 40A to 40C of the lower half 22 side are shorter than the butt-fitting convexes 41A to 41C of the lower half 23 side. Apparently, when the butt-fitting convexes 40A to 40C and the butt-fitting convexes 41A to 41C are butted against each other, the entire axial length is defined substantially equal to the height of the rising circumferential walls 38 and 39 butted against each other.

As shown in FIGS. 4 and 5, the butt-fitting convexes 40A to 40C and butt-fitting convexes 41A to 41C include two first butt-fitting convexes 40A and two first butt-fixing convexes 41A at two corners of the upper half 22 and two corners of the lower half 23, respectively, four second butt-fixing convexes 40B and four second butt-fitting convexes 41B at proper positions inside of the rising circumferential wall 38 and rising circumferential wall 39 of the upper half 22 and lower half 23, respectively, and one third butt-fitting convex 40C and one third butt-fitting convex 41C at corners on the rising circumferential wall 38 and rising circumferential 39 side of the upper half 22 and lower half 23, respectively.

These butt-fitting convexes have parts, which are welded by application of ultrasound so that corresponding butt-fitting convexes can be joined and fixed. In order to prevent displacements of the upper half 22 and lower half 23 due to vibration when ultrasound is applied thereto, a fourth butt-fitting convex 45 and fourth butt-fitting convex 46 each without welded parts are provided. The fourth butt-fitting convexes 45 and 46 restrict the positions where the guide planes 47a and 48a of slide guiding pieces 47 and 48 are attached such that the guide planes 47a and 48a can be continuous to be flat, which will be described later.

Next, as shown in FIGS. 1 to 3, the write protect member 32 serving as a part of the write protect mechanism of the disk cartridge 20 is provided at the corner between the back face 24b of the cartridge body 24 and the side face 24d orthogonal to the back face 24b.

First Embodiment

The write protect mechanism of the disk cartridge 20 including a construction of the write protect member 32 according to a first embodiment of the invention will be described below with reference to FIGS. 6 to 14.

Figure 6:
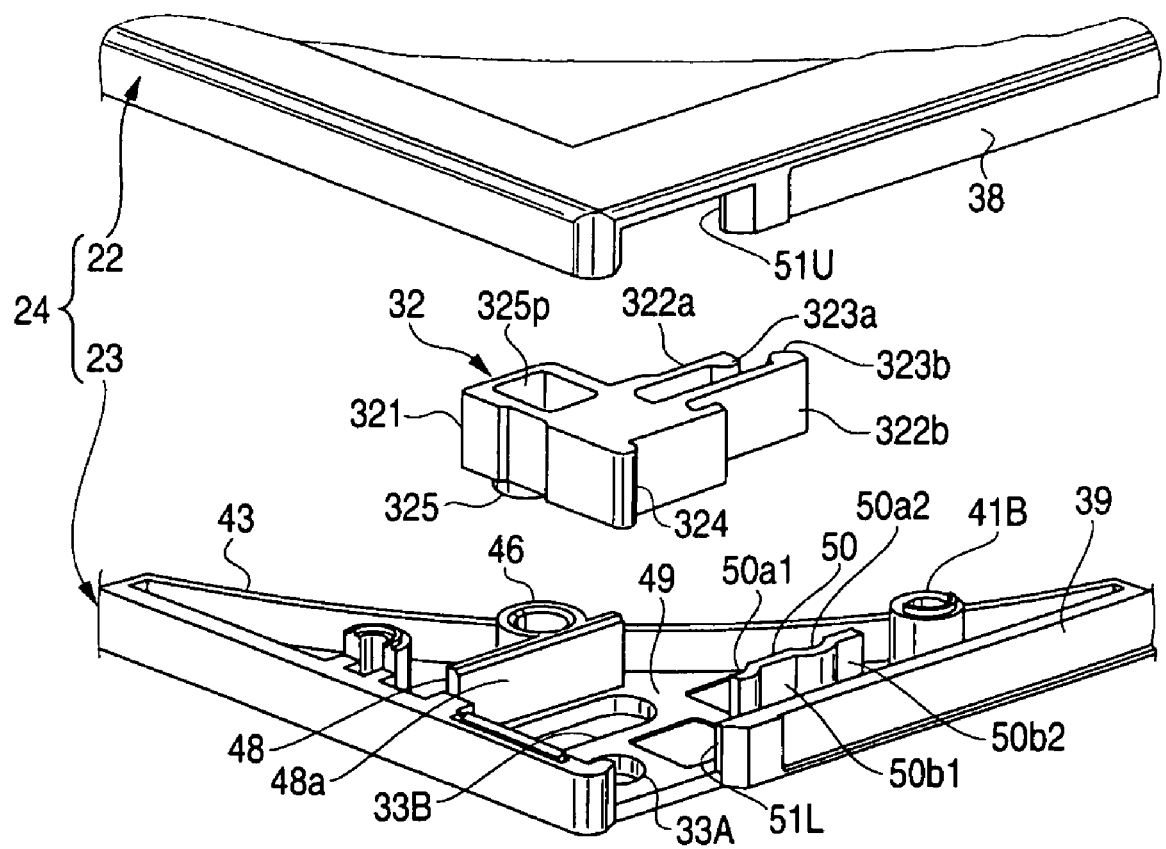
FIG. 6 is an exploded perspective view of the disk cartridge 20 from the upper half 22 side illustrating a part where the write protect member 32 is assembled.
Figure 7:
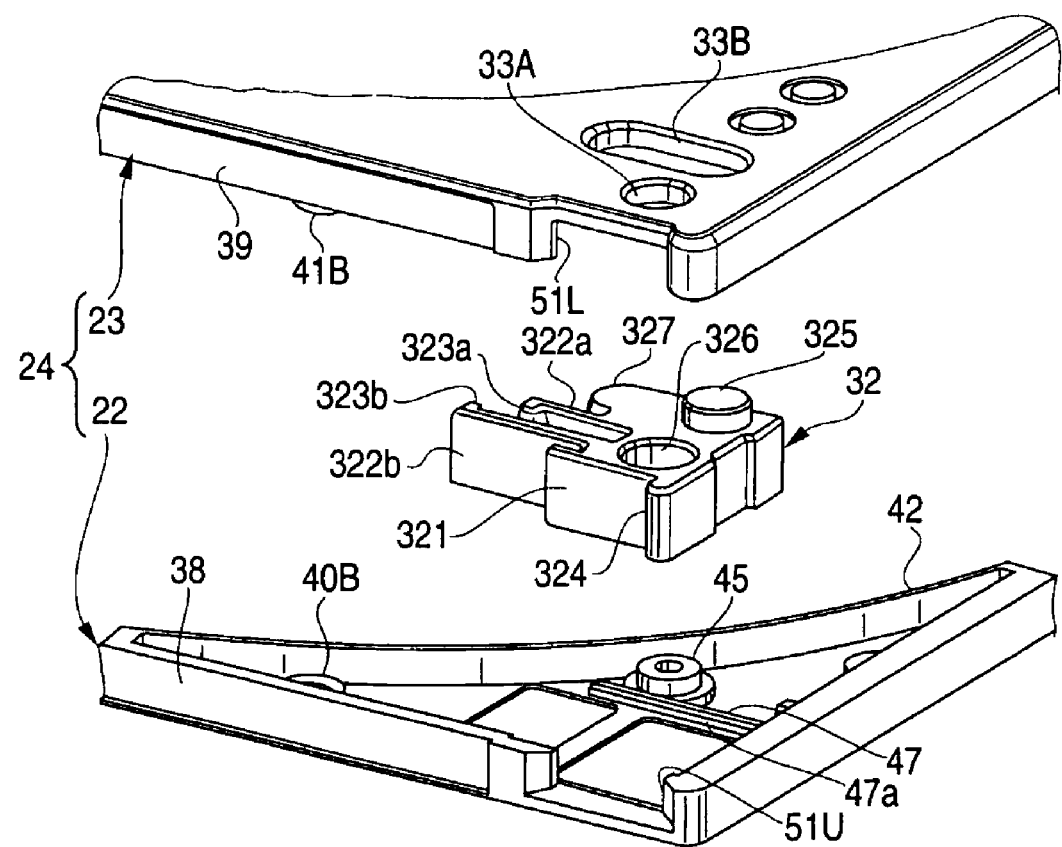
FIG. 7 is an exploded perspective view of the disk cartridge 20 from the lower half 23 side illustrating the part where a write protect member 32 is assembled.
Figure 8:
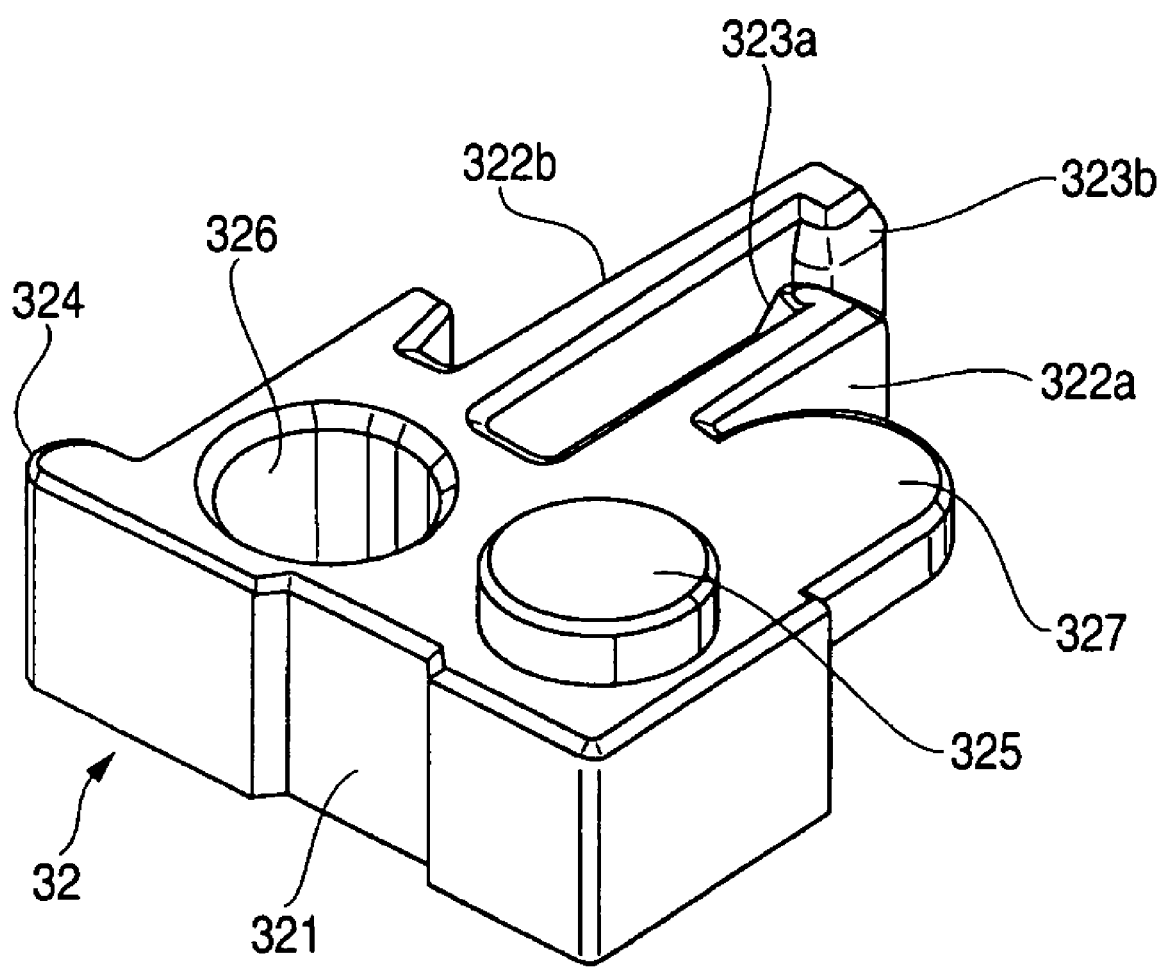
FIG. 8 is an entire perspective view of the write protect member 32 from the bottom side.
Figure 9A:
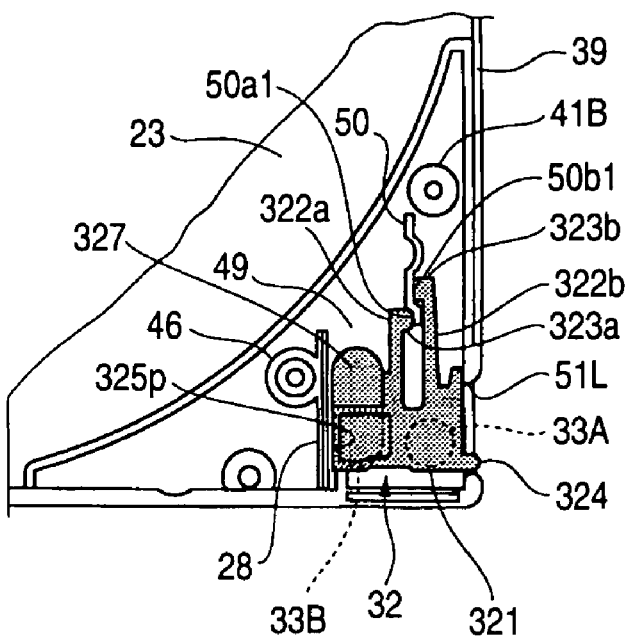
FIGS. 9A and 9B are plan views each illustrating a state that the write protect member 32 is positioned at a write enable position.
Figure 9B:
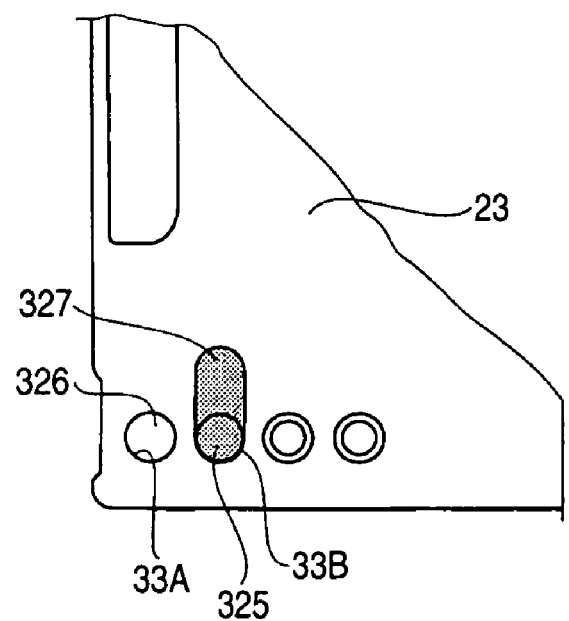
Figure 10A:
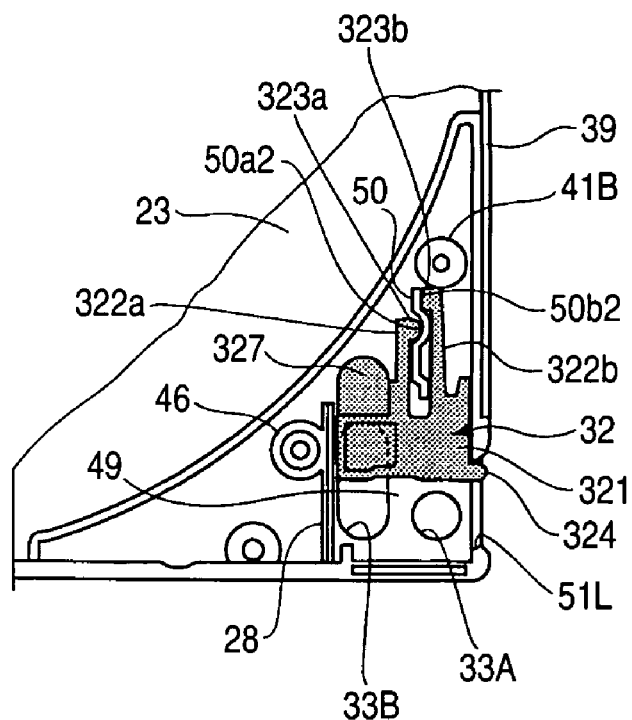
FIGS. 10A and 10B are plan views each illustrating a state that the write protect member 32 is positioned at a write disable position.
Figure 10B:
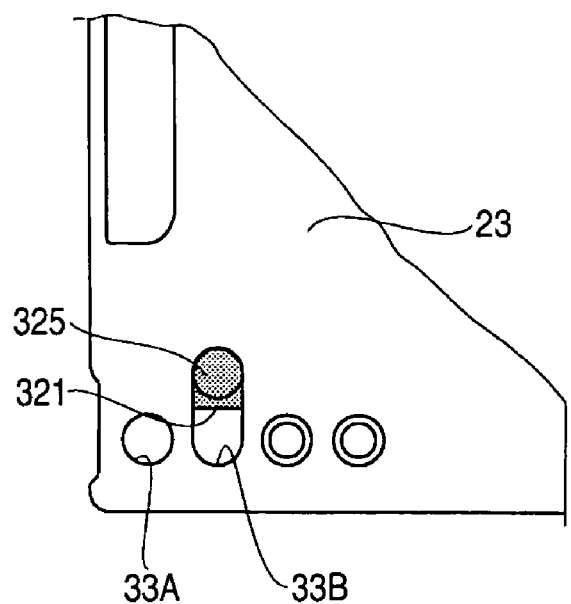
Figure 11A:
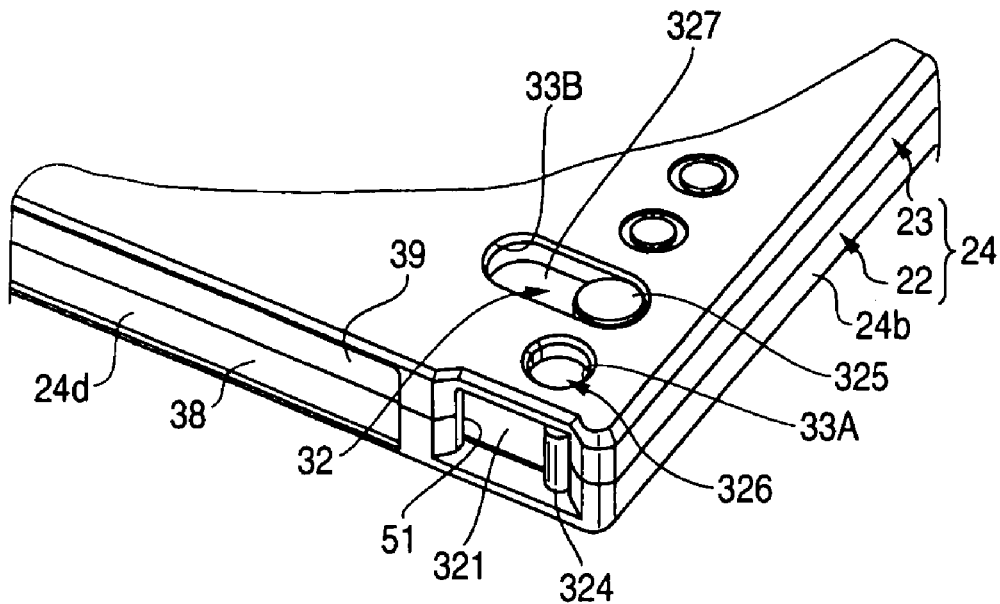
FIGS. 11A and 11B are main part perspective views each showing first and second write enable/disable detecting holes 33A and 33B of the disk cartridge 20.
Figure 11B:
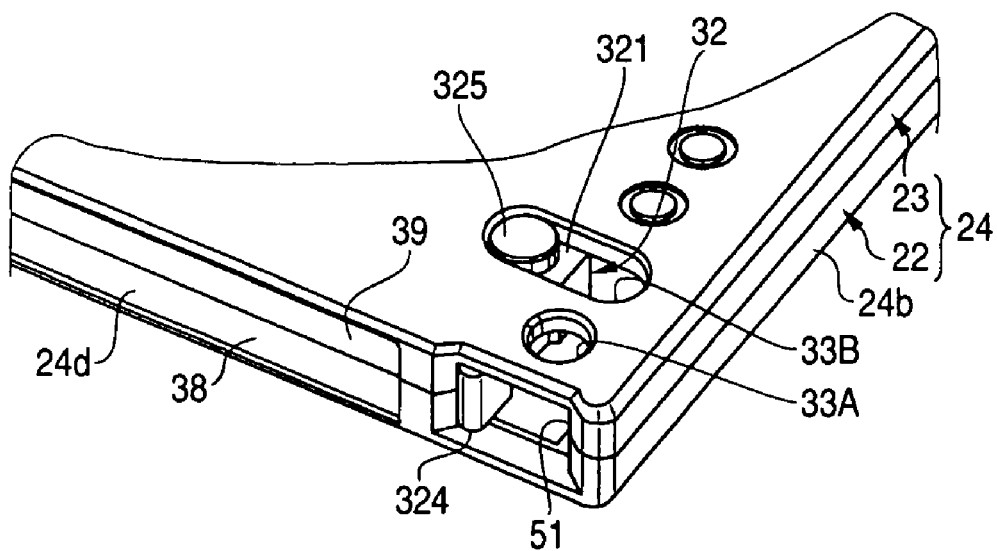
Figure 12:
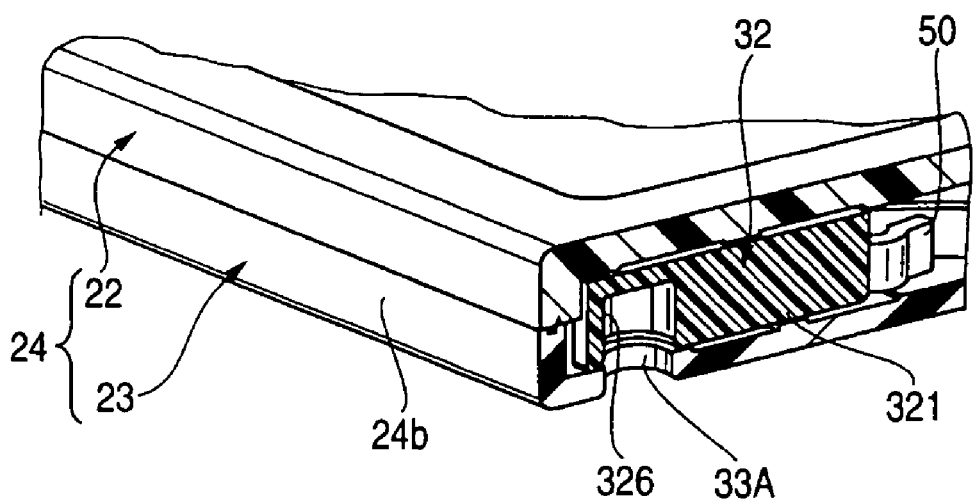
FIG. 12 is a main part section view of the disk cartridge 20 in which the write protect member 32 is positioned at the write enable position.
Figure 13:
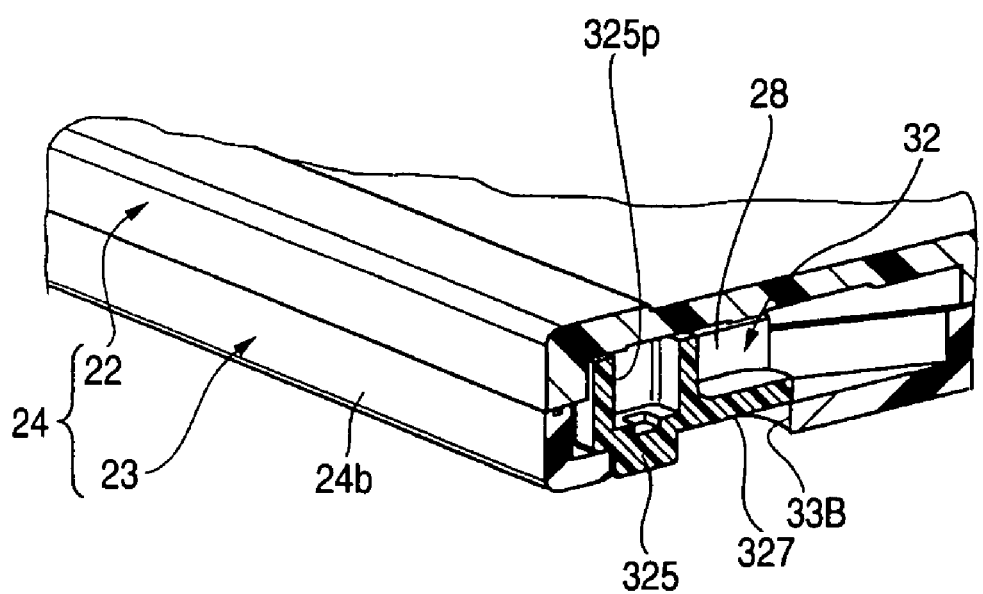
FIG. 13 is another main part section view of the disk cartridge 20 in which the write protect member 32 is positioned at the write enable position.
Figure 14:
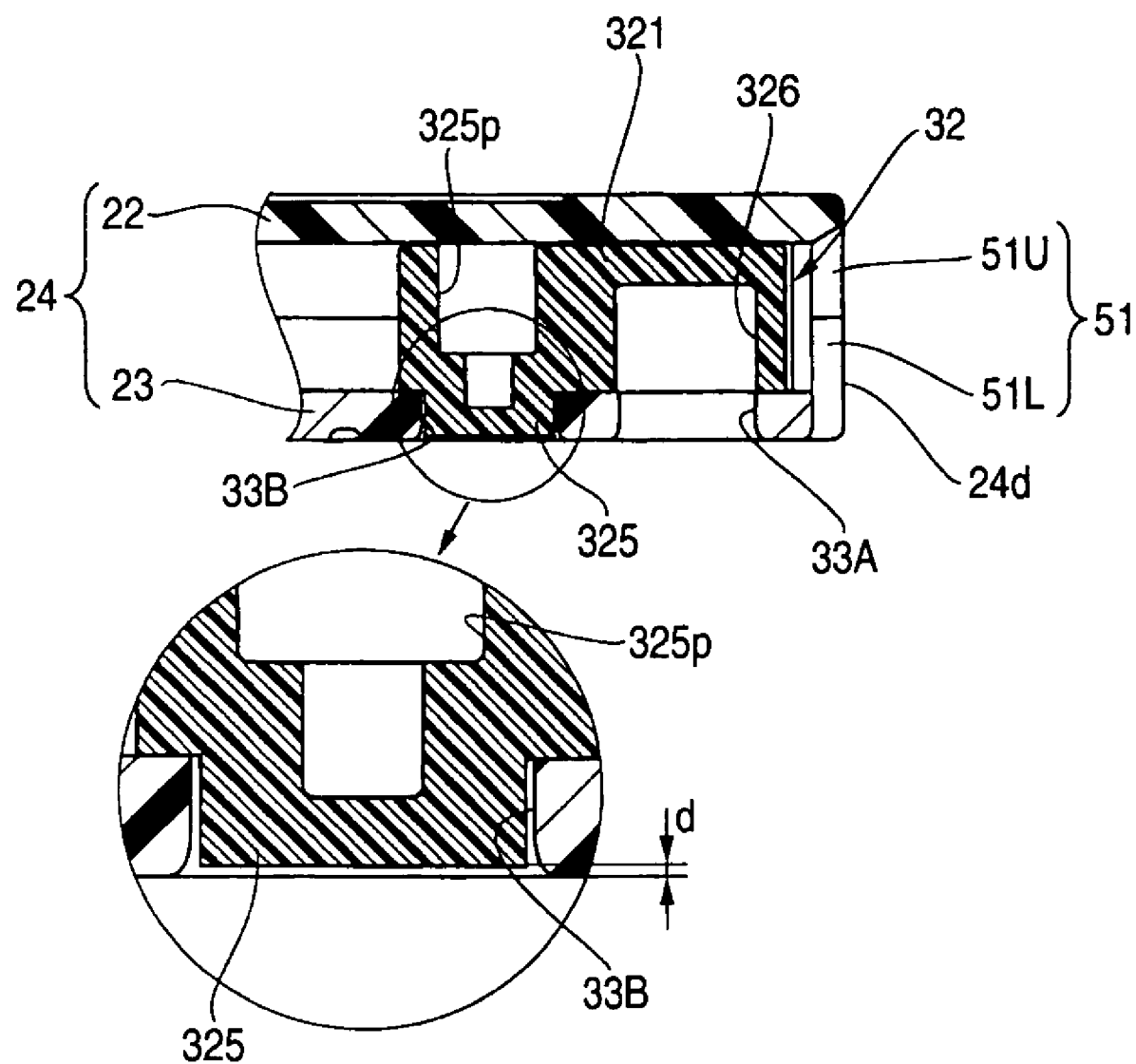
FIG. 14 is another main part section view of the disk cartridge 20 in which the write protect member 32 is positioned at the write enable position.

Here, FIG. 6 is an exploded perspective view of the disk cartridge 20 from the upper half 22 side illustrating a part where the write protect member 32 is assembled. FIG. 7 is an exploded perspective view thereof from the lower half 23 side. FIG. 8 is an entire perspective view of the write protect member 32 from the bottom side. FIGS. 9A and 9B are main part plan views of the inner side and outer side of the lower half 23 in which the write protect member 32 is positioned at a write enable position. FIGS. 10A and 10B are main part plan views of the inner side and outer side of the lower half 23 in which the write protect member 32 is positioned at a write disable position. FIGS. 11A and 11B are main part perspective views showing the vicinity of write enable/disable detecting holes 33A and 33B of the disk cartridge 20. FIGS. 12 and 13 are main part section views of the disk cartridge 20. FIG. 14 is a main part section view of the disk cartridge 20 illustrating relationships between the write protect member 32 and the write enable/disable detecting holes 33A and 33B.

The write protect mechanism of the disk cartridge 20 has a structure for detecting whether data can be written or not by a writer/reader compliant with the disk cartridge 20 and further has a structure inhibiting an operation of writing data by a writer/reader compliant with a first disk cartridge having a lower recording capacity than that of the disk cartridge 20.

The write protect member 32 is held in the storage section 49 in the lower half 23. The corner of the lower half 23 corresponding to the part having the storage section 49 has a first write enable/disable detecting hole 33A and second write enable/disable detecting hole 33B therethrough, which are opened and closed by the write protect member 32. These first and second write enable/disable detecting holes 33A and 33B are provided entirely through the lower half 23 so that the inside of the cartridge body 24 can communicate with the outside (see FIG. 11).

The first write enable/disable detecting hole 33A and second write enable/disable detecting hole 33B are used for detecting whether data can be written to and/or erased from the disk-shaped recording medium 21 and have a size large enough for allowing a write protect detecting plug within a writer/reader to enter. The first write enable/disable detecting hole 33A is located at a write enable/disable detecting position for the first disk cartridge (having a low recording capacity), which serves as a standard, and the second write enable/disable detecting hole 33B is located at a write enable/disable detecting position for the second disk cartridge 20 (having a high recording capacity). The first write enable/disable detecting hole 33A and the second write enable/disable detecting hole 33B are adjacent to each other at one corner of the lower half 23. The first write enable/disable detecting hole 33A is located more closely to the cartridge side face 24d side than the position of the second write enable/disable detecting hole 33B.

According to this embodiment, the first write enable/disable detecting hole 33A is a circular hole while the second write enable/disable detecting hole 33B is a long hole extending toward the front and rear of the cartridge. The position of the first write enable/disable detecting hole 33A corresponds to the position of the first write enable/disable detecting hole 105 (see FIGS. 22 and 23) in the disk cartridge 10 having a low recording capacity. The position of the second write enable/disable detecting hole 33B corresponds to the position of the spare hole 107 (see FIGS. 22 and 23) in the disk cartridge 10 having a low recording capacity. The distance between the centers of the first and second write enable/disable detecting hole 33A and 33B is about 4 mm, for example.

The write protect member 32 is a molded product made of a synthetic resin material such as polypropylene and polyethylene, for example. The write protect member 32 includes a body portion 321, a pair of elastic arm portions 322a and 322b and a movement operating portion 324.

The body portion 321 can move to the positions of the first and second write enable/disable detecting holes 33A and 33B in the storage section 49 and, as shown in FIG. 9A, is wide enough for covering the first and second write enable/disable detecting holes 33A and 33B at the same time.

The elastic arm portions 322a and 322b face toward each other and project from the distal side (the upper end side in FIG. 9A) of the body portion 321 and can be elastically deformed such that they can touch and leave each other. The elastic arm portions 322a and 322b have different length from each other, and one elastic arm portion 322b is longer than the other elastic arm portion 322a.

Distal parts of the elastic arm portions 322a and 322b have associating convexes 323a and 323b projecting toward each other. The associating convexes 323a and 323b slide to a sliding position restricting piece 50, which will be described later, and associate with concaves 50a1, 50a2, 50b1 and 50b2 thereof (see FIGS. 9A and 10A).

The movement operating portion 324 projects from the lower right side, in FIG. 9A, of the body portion 321 toward an opening part 51L, which is a notch in the side face 24d of the lower half 23. The write protect member 32 can be moved to the write enable position shown in FIG. 9A and to the write disable position shown in FIG. 10A through the movement operating portion 324.

On the other hand, the sliding position restricting piece 50 standing in the storage section 49 guides the direction of movement of the pair of the elastic arm portions 322a and 322b and is held between the elastic arm members 322a and 322b.

The sliding position restricting piece 50 has the associating concaves 50a1 and 50a2 with which the associating convex 323a in the distal part of one elastic arm portion 322a associates and the associating concaves 50b1 and 50b2 with which the associating concave 323b in the distal part of the other elastic arm portion 322b associates (see FIGS. 5 and 6). These associating concaves 50a1, 50a2, 50b1 and 50b2 are substantially half-round concaves in parts of the sliding position restricting piece 50 and are positioned so as to associate with the associating convexes 323a and 323b when the write protect member 32 is moved to the positions of the first and second write enable/disable detecting holes 33A and 33B and to the positions where the first and second write enable/disable detecting holes 33A and 33B are open.

The opening part 51L, which is a notch, in the rising circumferential wall 39 at the circumferential edge of the lower half 23 exposes the movement operating portion 324 of the write protect member 32 to the outside of the cartridge body 24 and is long enough for moving the movement operating portion 324 between the positions where the write protect member 32 closes and opens the first and second write enable/disable detecting holes 33A and 33B (see FIGS. 9A and 10A).

The rising circumferential wall 38 at the circumferential edge of the upper half 22 has an opening part 51U in accordance with the position of the opening part 51L of the lower half 23 (see FIGS. 4 and 6). The opening part 51U abuts on the opening part 51L in the lower half 23 so that the cartridge body 24 can have an operation guiding hole 51 (see FIGS. 2 and 11) for moving the write protect member 32. The movement operating portion 324 of the write protect member 32 is exposed to the outside through the operation guiding hole 51 so as to be manipulated from the outside of the cartridge body 24.

The slide guiding piece 48 stands and faces toward the opening part 51L within the lower half 23. On the other hand, the slide guiding piece 47 also stands and faces toward the slide guiding piece 48 within the upper half 22 and is butted against the slide guiding piece 48 so that a slide guiding wall can be provided therein for guiding the direction of movement of the write protect member 32.

The fourth butt-fitting convex 45 stands in contact with the non-guiding surface of the slide guiding piece 47. Furthermore, the fourth butt-fitting convex 46 stands in contact with the non-guiding surface of the slide guiding piece 48 on the lower half 23 side and can be butted against and bonded to the fourth butt-fitting convex 45 on the upper half 22 side. The bond of the butted fourth butt-fitting convexes 45 and 46 restricts the positions where the guide planes 47a and 48a of the slide guiding walls are attached such that the guide planes 47a and 48 can be continuous to be flat.

As shown in FIG. 8, the lower side of the body portion 321 of the write protect member 32 has a convex plane 325 and a concave 326.

The convex plane 325 has a substantially circular section and fits to the second write enable/disable detecting hole 33B of the lower half 23 and can move within the long second write enable/disable detecting hole 33B in accordance with a movement operation on the body portion 321 (see FIGS. 9B, 10B and 11). In other words, the major (longer) axis of the long second write enable/disable detecting hole 33B is large enough for preventing the write protect member 32 from touching the convex plane 325 when the write protect member 32 is moved to the write enable position or write disable position.

As shown in FIG. 14, the circumferential surface of the convex plane 325 is large enough for facing toward the circumferential wall of the second write enable/disable detecting hole 33B with a small space therebetween, and smooth movement operations of the write protect member 32 are allowed without interference with each other.

The convex plane 325 does not project to the outer surface side of the lower half 23 through the second write enable/disable detecting hole 33B, and a distance d between the outer surface of the lower half 23 and the top surface of the convex plane 325 is equal to or larger than 0 mm and is equal to or smaller than 0.25 mm. This can suppress variations in amount of a write protect detecting plug of a writer/reader entered, which touches the convex plane 325, since the convex plane 325 is constructed as a write enable/disable detection reference plane.

In relation thereto, a relief 325p is provided at a position, which corresponds to the position of the convex plane 325, on the opposite surface (upper surface) of the surface having the convex plane 325 of the body portion 321 so that the deterioration of flatness due to shrinkage of the convex plane 324 in a molding step can be prevented.

On the other hand, as shown in FIG. 12, at the write enable position where the write protect member 32 covers the first write enable/disable detecting hole 33A, the concave 326 is positioned at a lower surface part of the body portion 321 aligning with the first write enable/disable detecting hole 33A. The concave 326 has a circular form having an equal diameter to that of the first write enable/disable detecting hole 33A and is deep enough for detecting that an amount of a write protect detecting plug within a writer/reader entered into the first write enable/disable detecting hole 33A indicates "write disable state". For example, the concave 326 may be defined to have a depth of 3 mm or larger from the outer surface of the lower half 23.

As shown in FIG. 13, the body portion 321 further has a closing section 327 that closes the second write enable/disable detecting hole 33B in conjunction with the convex plane 325 when the write protect member 32 is at the write enable position. The closing section 327 can prevent invasion of dust into the cartridge through the second write enable/disable detecting hole 33B when the write protect member 32 is at the write enable position.

Next, operations of the disk cartridge 20 according to this embodiment having the above-described construction will be described.

When data signals can be written to or erased from the disk-shaped recording medium 21 accommodated within the cartridge body 24, the write protect member 32 is operated to move to the write enable position having the first and second write enable/disable detecting holes 33A and 33B as shown in FIGS. 9, 11A, 12 to 14.

Under this condition, the concave 326 of the body portion 321 of the write protect member 32 is aligned with the first write enable/disable detecting hole 33A, and the convex plane 325 is positioned on the cartridge back face 24b side of the second write enable/disable detecting hole 33B. Furthermore, the closing section 327 closes the second write enable/disable detecting hole 33B. Here, as shown in FIG. 9A, the distal associating convexes 323a and 323b of the pair of elastic arm portions 322a and 322b associate with the associating concaves 50a1 and 50b1 of the sliding position restricting piece 50 so that the write protect member 32 can be positioned at the shown write enable position.

When the disk cartridge 20 is installed to a writer/reader therefor, a write protect detecting plug within a writer/reader enters toward the cartridge back face 24b side through the second write enable/disable detecting hole 33B of the cartridge body 24. Here, since the convex plane 325 of the write protect member 32 is positioned on the cartridge back face 24b side within the second write enable/disable detecting hole 33B, the distal part of the write protect detecting plug touches the convex plane 325 and the amount of the plug entered thereof is restricted thereby. As a result, the writer/reader detects that the disk cartridge 20 is write-enabled.

On the other hand, when the disk cartridge 20 is installed to a writer/reader compliant with a disk cartridge having a recording capacity that is lower than that of the above-described one, the write protect detecting plug within the writer/reader enters into the first write enable/disable detecting hole 33A of the cartridge body 24. At that time, the first write enable/disable detecting hole 33A aligns with the concave 326 of the write protect member 32 as shown in FIGS. 12 and 14, and the alignment with the concave 326 opens the first write enable/disable detecting hole 33A. Therefore, the write protect detecting plug can enter into the first write enable/disable detecting hole 33A without any restriction and detects that the disk cartridge 20 is write-disabled when the amount of the plug entered reaches a predetermined amount.

Then, when data signals cannot be written to or erased from the disk-shaped recording medium 21 accommodated within the cartridge body 24, the write protect member 32 is operated to move to the write disable position as shown in FIGS. 10A and 10B and 11B.

Under this condition, the write protect member 32 is at the position where it does not cover the first write enable/disable detecting hole 33A. Thus, the first write enable/disable detecting hole 33A is opened, and the area on the cartridge back face 24b side of the second write enable/disable detecting hole 33B is opened, and the area on the cartridge front face 24a side has the convex plane 325. Here, as shown in FIG. 10A, the distal associating convexes 323a and 323b of the pair of elastic arm portions 322a and 322b associate with the associating concaves 50a2 and 50b2 of the sliding position restricting piece 50, respectively, so that the write protect member 32 can be positioned at the shown write disable position.

When the disk cartridge 20 is installed to a writer/reader compliant thereto, a write protect detecting plug within the writer/reader enters toward the cartridge back face 24b side through the second write enable/disable detecting hole 33B of the cartridge body 24. At that time, since the cartridge back face 24b side within the second write enable/disable detecting hole 33B is open, the write protect detecting plug enters into the second write enable/disable detecting hole 33B without restriction and detects that the disk cartridge 20 is write-disabled when the amount of the plug entered reaches a predetermined amount.

On the other hand, when the disk cartridge 20 is installed to a writer/reader compliant with a disk cartridge having a recording capacity that is lower than that of the above-described one, the write protect detecting plug within the writer/reader enters into the first write enable/disable detecting hole 33A of the cartridge body 24. At that time, since the first write enable/disable detecting hole 33A is open, the write protect detecting plug enters into the first write enable/disable detecting hole 33A without restriction and detects that the disk cartridge 20 is write-disabled when the amount of the plug entered reaches a predetermined amount.

As described above, in the disk cartridge 20 of this embodiment, the second write enable/disable detecting hole 33B can be at the write disable position or write enable position while the first write enable/disable detecting hole 33A is always at the write disable position, which can inhibit operations of writing data signals by a writer/reader compliant with a disk cartridge having a lower recording capacity than that of the disk cartridge 20. Thus, problems such as unstable operations by a writer/reader due to attachment of different kinds of disk cartridge and disability of the function of ejecting cartridges can be avoided.

When the disk cartridge 10 having a lower recording capacity is installed to a writer/reader compliant with the disk cartridge 20 according to this embodiment, a write protect detecting plug enters into the spare hole 107 opening adjacent to the write enable/disable detecting hole 105 of the disk cartridge 10. Thus, even when a writing operation is performed thereon improperly, the write disable state of the disk cartridge 10 can be detected so that the improper writing operation can be avoided.

Furthermore, since the function is performed by the write protect member 32, which is a single member, according to this embodiment, increases in number of parts and assembly costs and so on can be avoided. Furthermore, since the body portion 321 integrally has the concave 326 for opening the first write enable/disable detecting hole 33A, an area for the movement operating portion 324 can be attained. Thus, the same operability of the write protect member 32 can be obtained as before.

Second Embodiment

Next, a write protect mechanism of the disk cartridge 20 including a write protect member 32' according to a second embodiment of the invention will be described with reference to FIGS. 15 to 20B.

Figure 15:
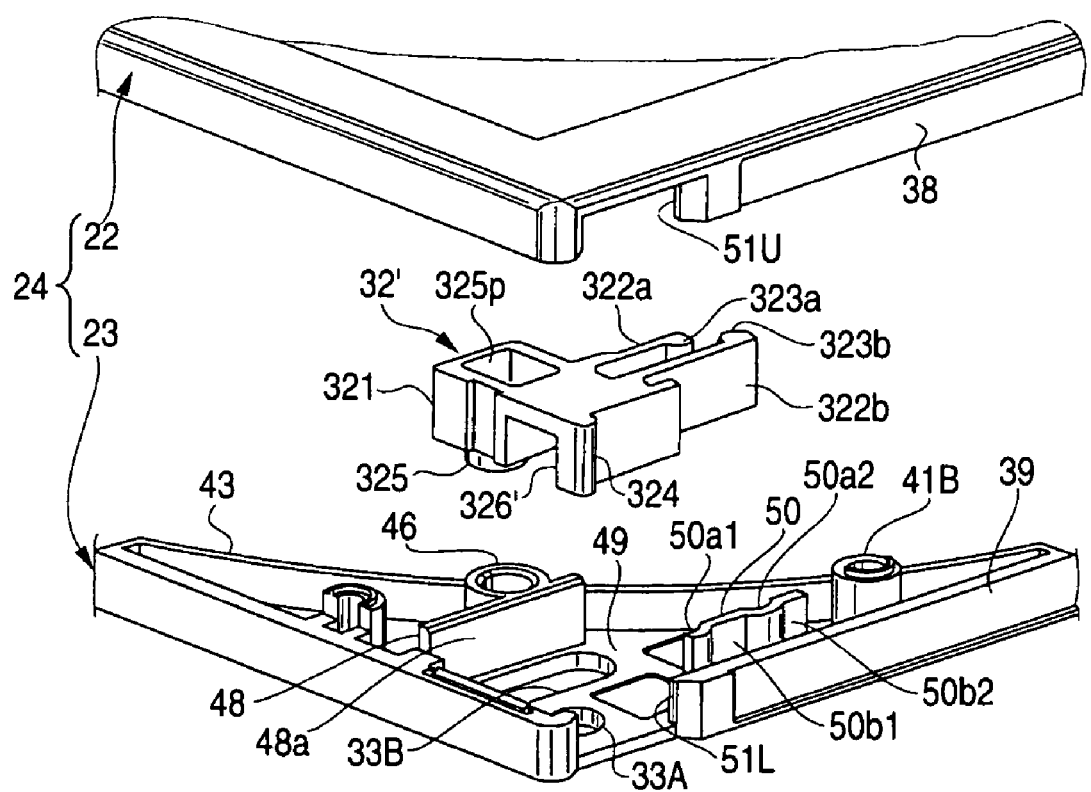
FIG. 15 is an exploded perspective view of a part where a write protect member 32' according to another embodiment of the invention is assembled in the disk cartridge from the upper half 22 side.
Figure 16:
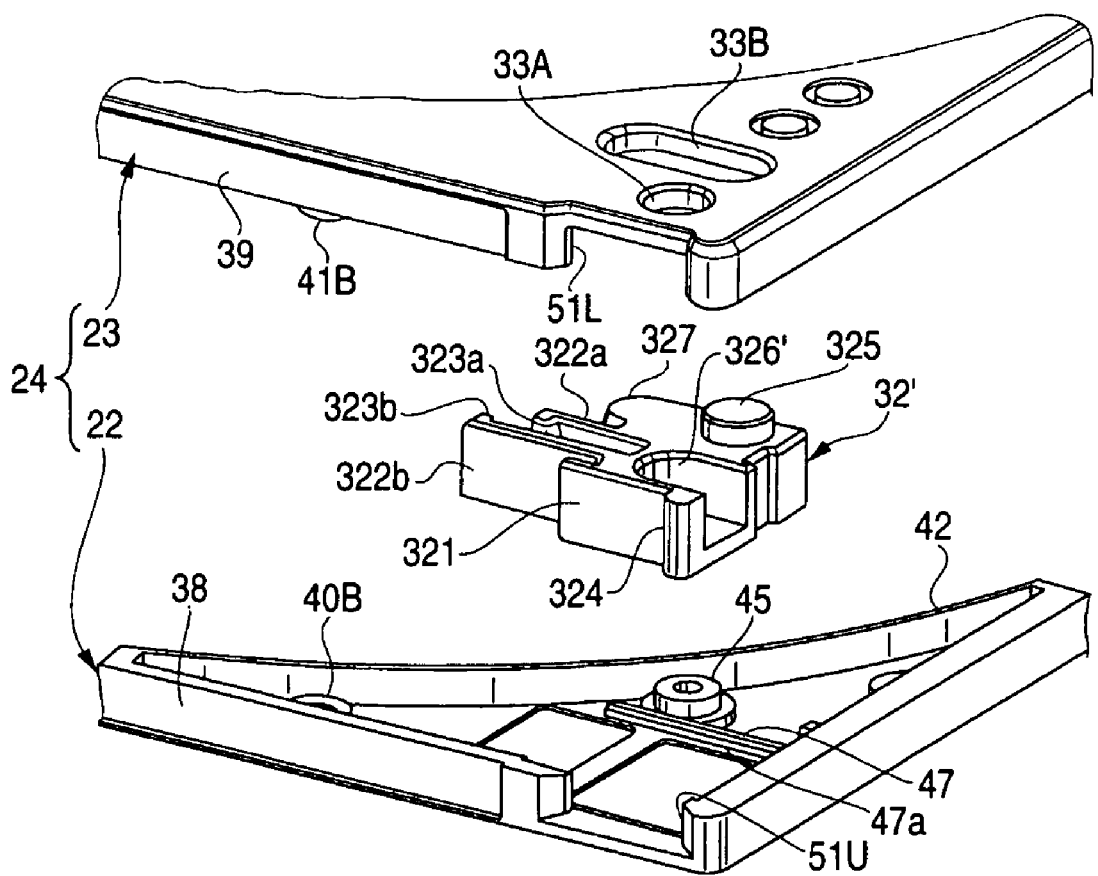
FIG. 16 is an exploded perspective view of the part where the write protect member 32' is assembled in the disk cartridge 20 from the lower half 23 side.
Figure 17:
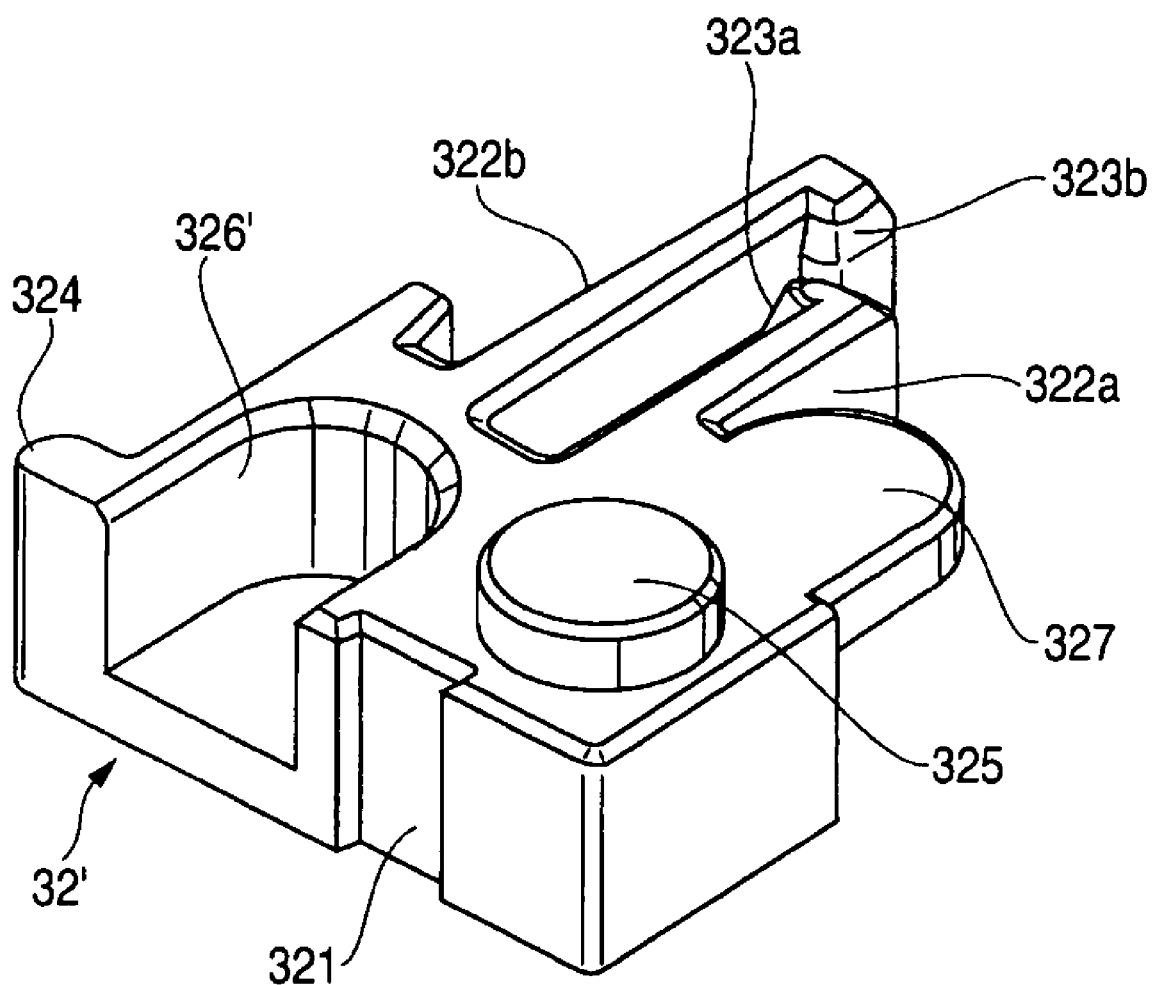
FIG. 17 is an entire perspective view of the write protect member 32' from the bottom side.
Figure 18:
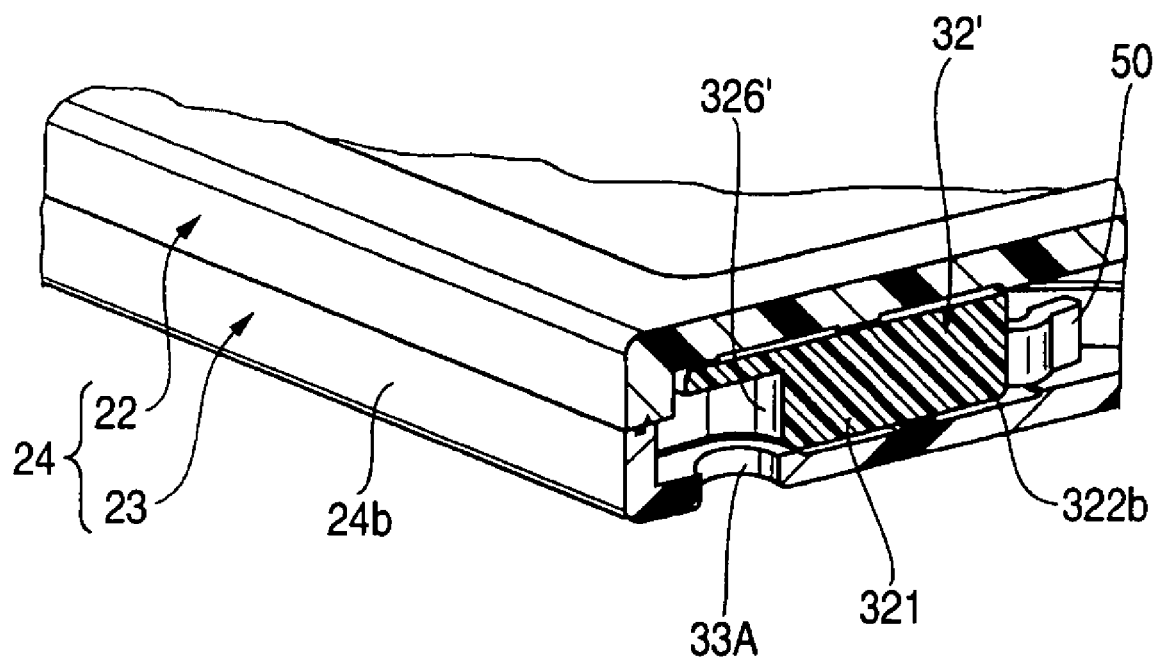
FIG. 18 is a main part section view of the disk cartridge 20 in which the write protect member 32' is positioned at the write enable position.
Figure 19A:
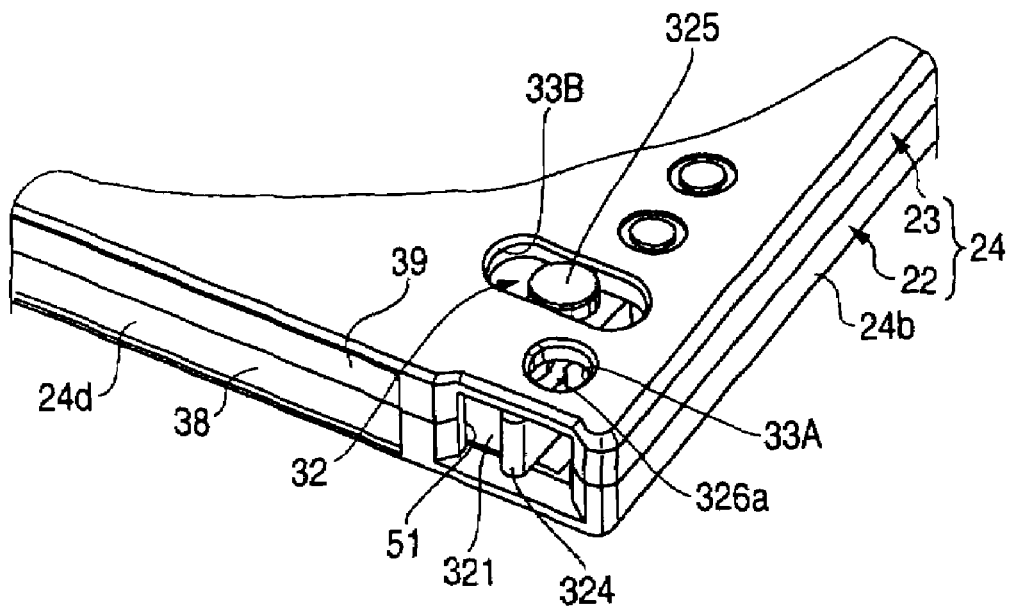
FIGS. 19A and 19B are diagrams each illustrating a state that the write protect member 32' is positioned between the write enable position and write disable position.
Figure 19B:
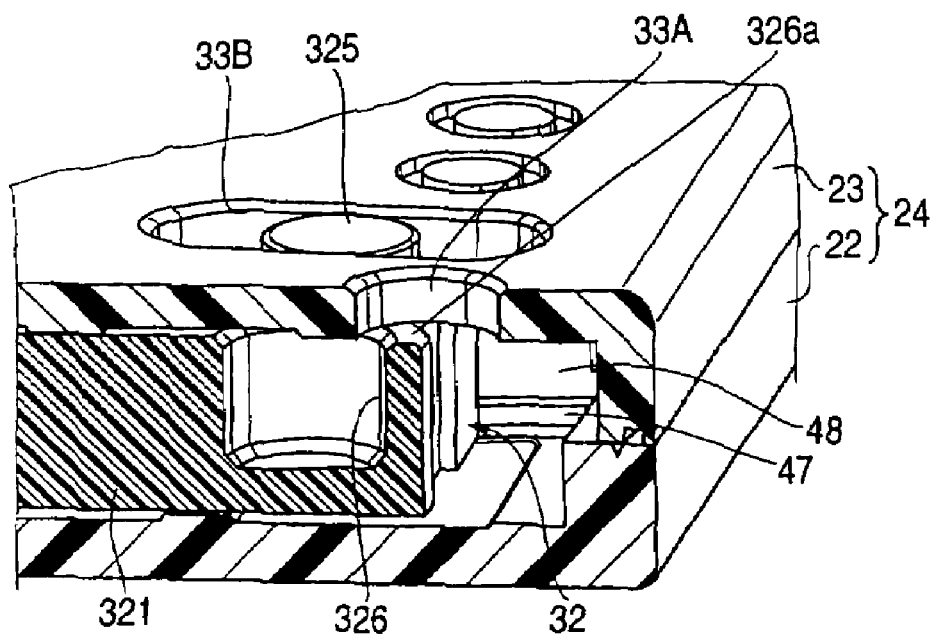
Figure 20A:
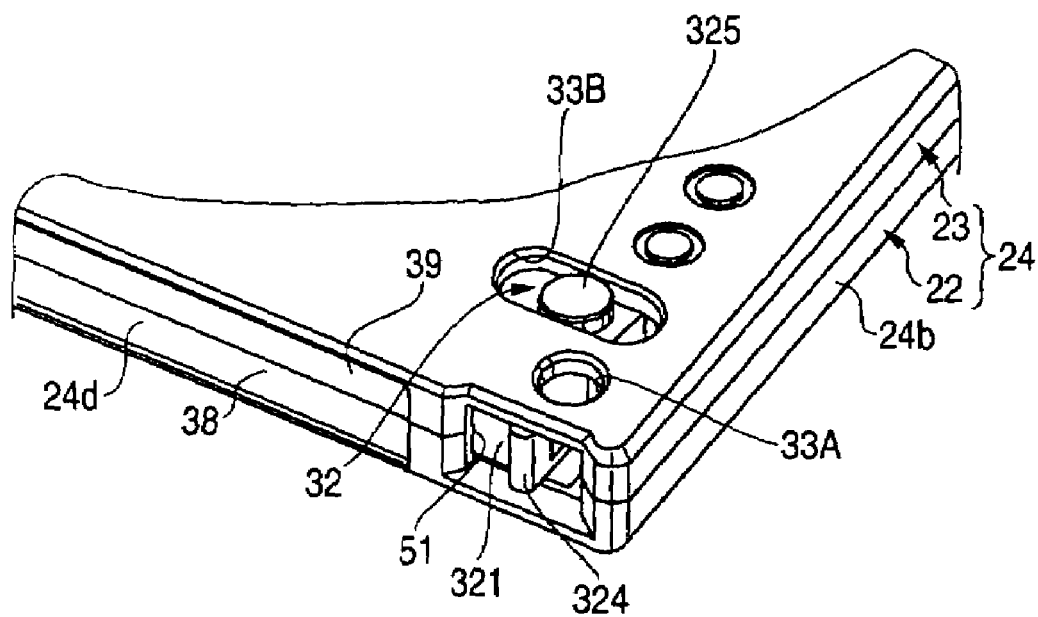
FIGS. 20A and 20B are diagrams each illustrating a state that the write protect member 32' is positioned between the write enable position and write disable position.
Figure 20B:
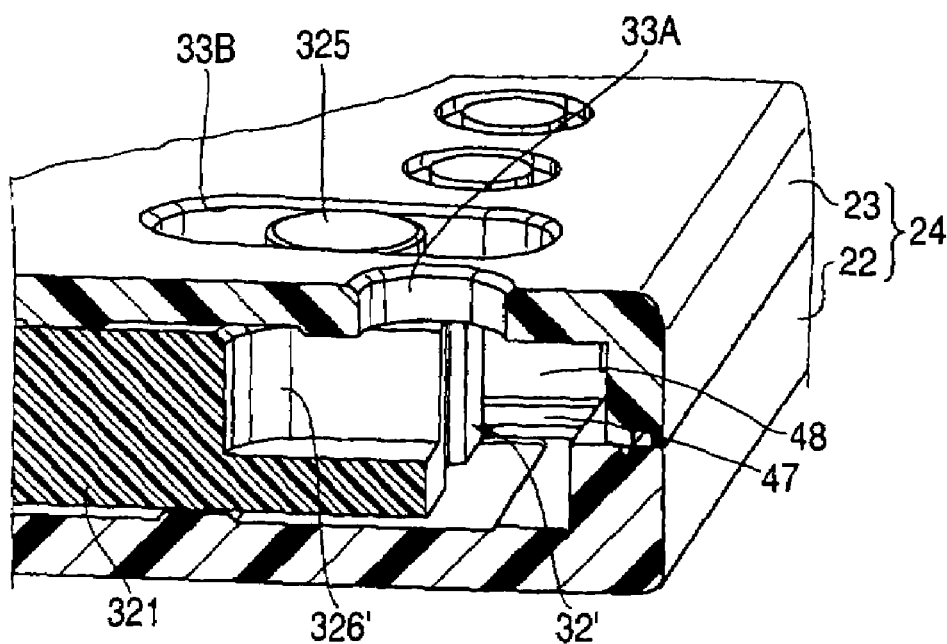
Figure 21:
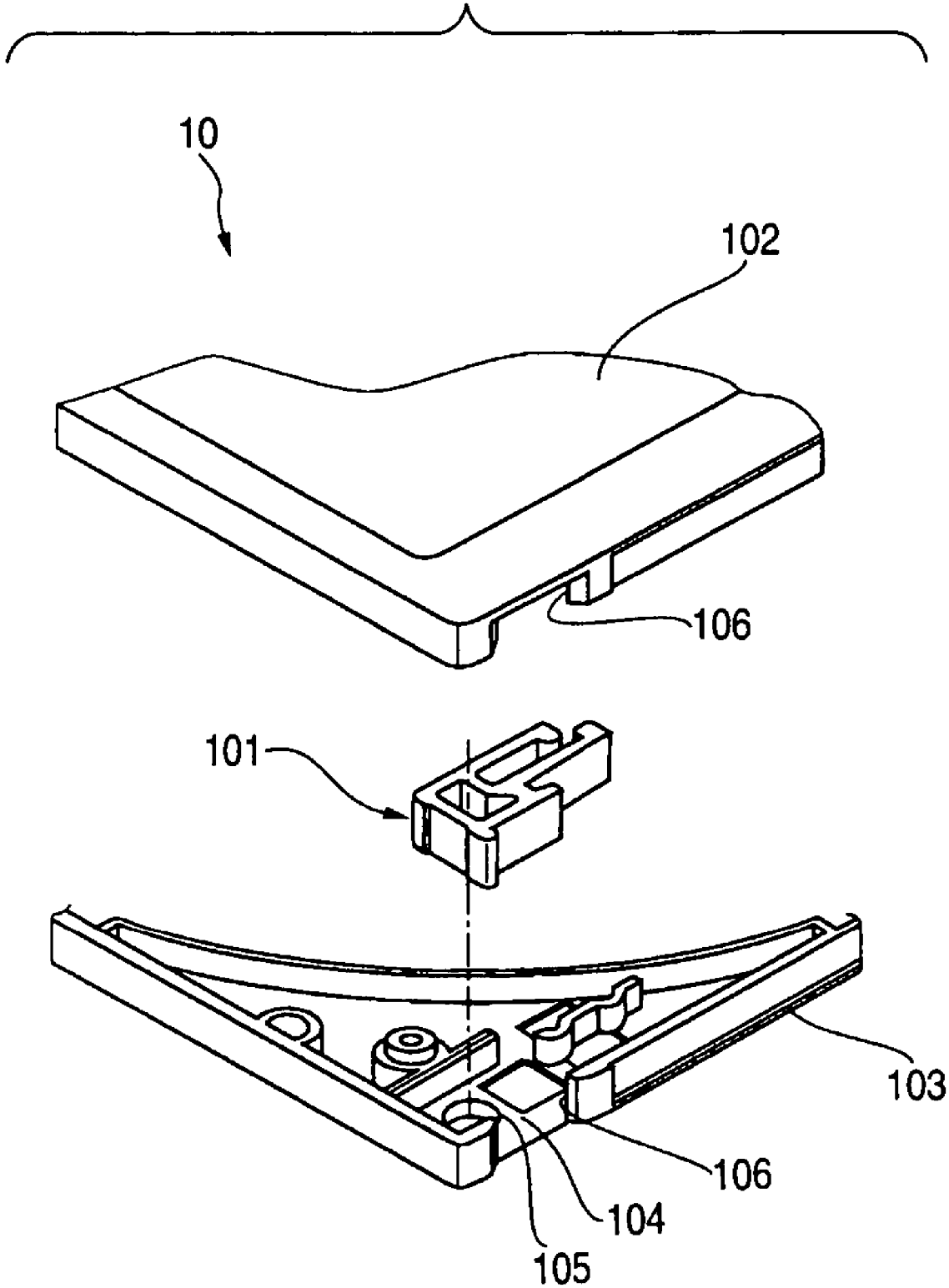
FIG. 21 is an exploded perspective view, from the upper half 102 side, of a part where a write protect member 101 of a first disk cartridge serving as a standard is assembled.
Figure 22A:
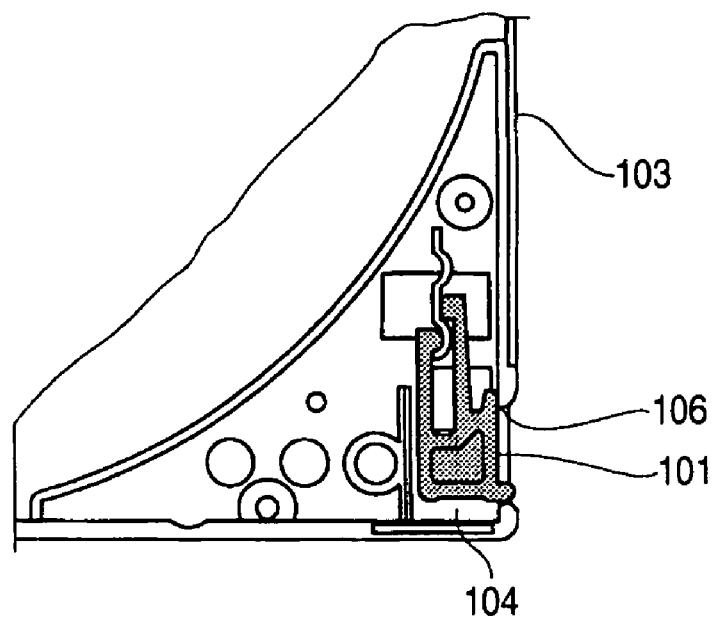
FIGS. 22A and 22B are plan views each illustrating a state where the write protect member 101 is positioned at the write enable position.
Figure 22B:
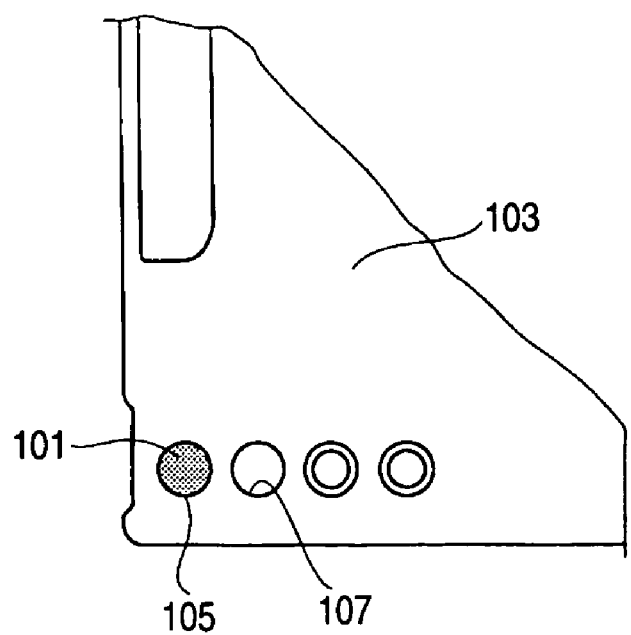
Figure 23A:
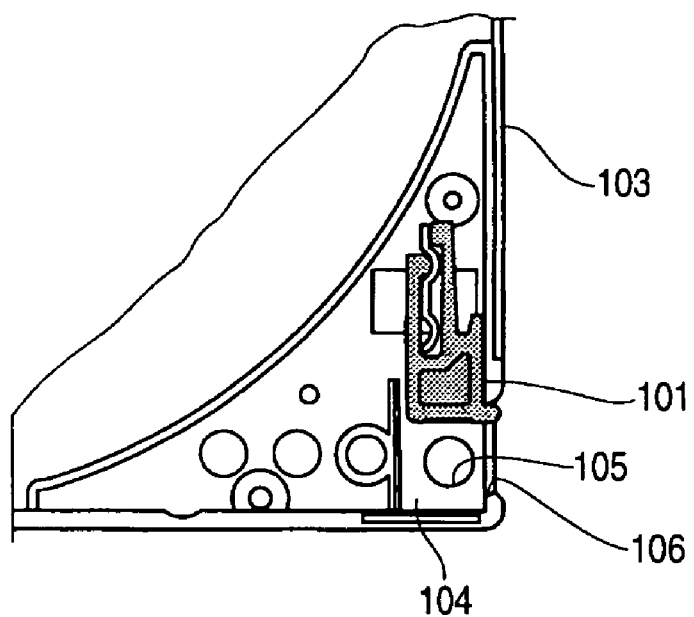
FIGS. 23A and 23B are plan views each illustrating a state where the write protect member 101 is positioned at the write disable position.
Figure 23B:
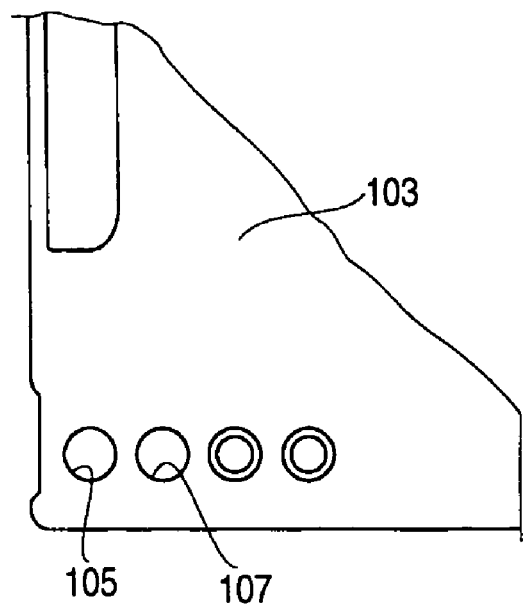

FIG. 15 is an exploded perspective view of a part where the write protect member 32' is assembled of the disk cartridge 20 from the upper half 22 side. FIG. 16 is an exploded perspective view from the lower half 23 side. FIG. 17 is an entire perspective view of the write protect member 32' from the bottom side. FIG. 18 is a main part section view of the disk cartridge 20. FIGS. 19A and 19B are main part section views each illustrating an operation of the write protect member 32 of the first embodiment. FIGS. 20A and 20B are main part section views each illustrating an operation of the write protect member 32' of this embodiment. The same reference numerals are given to the components corresponding to those of the first embodiment in these drawings, and the detail descriptions will be omitted.

Like the write protect member 32 according to the first embodiment, the write protect member 32' of this embodiment includes the body portion 321, the pair of elastic arm portions 322a and 322b, the associating convexes 323a and 323b, the movement operating portion 324, a concave 326' and the closing section 327 and is assembled in the storage section 49 of the lower half 23 (see FIG. 15).

The construction of the concave 326' of the write protect member 32' differs from the construction of the concave 326 of the write protect member 32 according to the first embodiment. That is, as shown in FIGS. 17 and 18, the concave 326' of the write protect member 32' of this embodiment has a long-hole form having a concave section extending to the rear end side of the body portion 321 (that is, the opposite side of the elastic arm portions 322a and 322b side) and opens the first write enable/disable detecting hole 33A in the range of the movement of the body portion 321 (see FIGS. 20A and 20B).

According to the first embodiment, when the write protect member 32 is incompletely operated, for example, the write protect member 32 may be positioned between the write enable position and write disable position as shown in FIGS. 19A and 19B. In this case, the rear end 326a of the body portion 321 in the part having the concave 326 faces toward the first write enable/disable detecting hole 33A, and when the disk cartridge 20 is installed to a writer/reader compliant with a disk cartridge having a lower recording capacity and a write protect plug thereof enters into the first write enable/disable detecting hole 33A, the rear end 326a of the body portion 321 and the write protect detecting plug abut on each other. Thus, it may be determined that the first write enable/disable detecting hole 33A is at the write-enable state.

On the other hand, since, in the write protect member 32' of this embodiment, the concave 326' keeping the first write enable/disable detecting hole 33A open has a long hole form having a concave section extending to the rear end side of the body portion 321, the first write enable/disable detecting hole 33A is kept open at all times even when the write protect member 32' is positioned between the write enable position and the write disable position as shown in FIGS. 20A and 20B.

Therefore, according to this embodiment, even when the disk cartridge 20 is installed to a writer/reader compliant with a disk cartridge having a lower recording capacity with the write protect member 32' positioned between the write enable position and the write disable position, the open state of the first write enable/disable detecting hole 33A can be always properly detected. Thus, improper operations for writing or erasing data signals can be securely prevented.

Having described the embodiments of the invention above, the invention is not apparently limited thereto, and various changes and modifications can be made based on the technical scope and spirit of the invention.

For example, while the concaves 326 and 326' in the write protect members 32 and 32' are holes having bottoms according to the embodiments, the concaves 326 and 326' may be through-holes extending through the body portion 321 instead.

While, in each of the embodiments, a disk cartridge called mini-disk (MD) is used as the disk cartridge, for example, but the invention is not apparently limited thereto. The invention is applicable to a disk cartridge having another form accommodating a disk-shaped recording medium to and/or from which data signals can be written and/or erased, such as a flexible disk and a non-MD removable disk.

As described above, a writer/reader compliant with a first disk cartridge, which serves as a standard, can be prevented from improperly performing a writing or erasing operation in a disk cartridge of the invention. Thus, problems such as an unstable operation by the writer/reader and disability of the cartridge-ejecting function can be avoided.

What is claimed is:

1. A second disk cartridge having approximately the same shape as a disk cartridge which has a first recording capacity and a first disk-shaped recording medium within, the second disk cartridge having a second disk-shaped recording medium within and a second recording capacity greater than the first recording capacity, the second disk cartridge comprising:
a disk-shaped recording medium to and/or from which data can be written and/or erased;
a cartridge body for accommodating the disk-shaped recording medium;
write enable/disable detecting holes in the cartridge body for detecting whether data can be written to and/or erased from the disk-shaped recording medium; and
a write protect member slidably attached to the cartridge body for opening and closing one of the write enable/disable detecting holes and selectively being operated to move to a write enable position or an write disable position in accordance with the open and closed state thereof, the write enable/disable detecting holes including a first write enable/disable detecting hole at a write enable/disable detecting position for use with a first disk cartridge compatible device and a second write enable/disable detecting hole at a write enable/disable detecting position for use with a second disk cartridge compatible device, the first and second write enable/disable detecting holes being adjacent to each other; and the write protect member being a single member assembled in the positions of the first write enable/disable detecting hole and second write enable/disable detecting hole and is moved to the write disable position or the write enable position of the second write enable/disable detecting hole but is always in place at the write disable position of the first write enable/disable detecting hole.

2. A disk cartridge according to claim 1,
the write protect member having:
a body portion, which can be moved to the positions of the first and second write enable/disable detecting holes;
elastic arm portions for positioning the body portion at the write disable position or the write enable position; and
a concave in the body portion that is aligned with the first write enable/disable detecting hole for opening the first write enable/disable detecting hole when the second write enable/disable detecting hole is closed.

3. A disk cartridge according to claim 2,
wherein the first and second write enable/disable detecting holes are disposed at corners of one main plane of the cartridge body, and the first write enable/disable detecting hole is disposed on one side face side of the cartridge body with respect to the second write enable/disable detecting hole, and
the body portion includes an operating portion for operating to move the body portion toward an operation guiding hole in one side face of the cartridge body.

4. A disk cartridge according to claim 2, wherein the concave has a long hole form that opens the first write enable/disable detecting hole in the range of the movement of the body portion.

5. A disk cartridge according to claim 2, wherein the first write enable/disable detecting hole is a circular hole while the second write enable/disable detecting hole is a long hole, and the body portion has a convex plane that movably associates with the second write enable/disable detecting hole and is to be touched by a write protect detecting plug within a writer/reader.

* * * * *